(12) United States Patent
Guan et al.

(10) Patent No.: US 12,075,408 B2
(45) Date of Patent: Aug. 27, 2024

(54) COMMUNICATION METHOD AND APPARATUS

(71) Applicant: HUAWEI TECHNOLOGIES CO., LTD., Guangdong (CN)

(72) Inventors: Lei Guan, Beijing (CN); Hongjian Yang, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 17/519,797

(22) Filed: Nov. 5, 2021

(65) Prior Publication Data

US 2022/0061078 A1 Feb. 24, 2022

Related U.S. Application Data

(63) Continuation of application No. PCT/CN2020/085992, filed on Apr. 21, 2020.

(30) Foreign Application Priority Data

May 9, 2019 (CN) .......................... 201910385701.4

(51) Int. Cl.
*H04W 72/1273* (2023.01)
*H04L 1/08* (2006.01)
(Continued)

(52) U.S. Cl.
CPC ........... *H04W 72/1273* (2013.01); *H04L 1/08* (2013.01); *H04L 5/0053* (2013.01);
(Continued)

(58) Field of Classification Search
CPC ......... H04W 72/0466; H04W 72/0446; H04W 72/23; H04W 72/1273; H04L 5/0053; H04L 1/08
(Continued)

(56) References Cited

U.S. PATENT DOCUMENTS 11,576,200 B2 * 2/2023 Kim ..................... H04W 72/23
11,659,525 B2 * 5/2023 Eldessoki ............. H04W 72/51
370/329
(Continued)

FOREIGN PATENT DOCUMENTS

CN 103988559 A 8/2014
CN 106211086 A 12/2016
(Continued)

OTHER PUBLICATIONS

3GPP TS 38.300 V15.3.1 (Oct. 2018) (Year: 2018).*
(Continued)

*Primary Examiner* — Peter G Solinsky

(57) ABSTRACT

Embodiments of this application provide a communication method and an apparatus, relate to the communication field, and in particular, are applicable to a broadcast system. The method includes: A terminal device receives a first downlink channel from an access network device, where the first downlink channel is scrambled by using a first identifier and is used to carry first data. The terminal device receives a second downlink channel from the access network device, where the second downlink channel is scrambled by using a second identifier and is used to retransmit the first data. The first identifier and the second identifier are identifiers configured by the access network device. This method can implement a feedback retransmission mechanism combining broadcast initial transmission and partial retransmission, to further improve spectral efficiency of a communication system.

20 Claims, 7 Drawing Sheets

(51) Int. Cl.
  *H04L 5/00*     (2006.01)
  *H04W 72/044*   (2023.01)
  *H04W 72/0446*  (2023.01)
  *H04W 72/23*    (2023.01)

(52) U.S. Cl.
  CPC ... *H04W 72/0446* (2013.01); *H04W 72/0466* (2013.01); *H04W 72/23* (2023.01)

(58) Field of Classification Search
  USPC .......................................................... 370/329
  See application file for complete search history.

(56) References Cited

U.S. PATENT DOCUMENTS

| | | |
|---|---|---|
| 2016/0081093 A1 | 3/2016 | Hugl et al. |
| 2017/0265086 A1 | 9/2017 | Worrall et al. |
| 2018/0254872 A1 | 9/2018 | Seo et al. |
| 2022/0368468 A1* | 11/2022 | Xiong .................. H04L 1/1854 |

FOREIGN PATENT DOCUMENTS

| | | |
|---|---|---|
| CN | 107027180 A | 8/2017 |
| CN | 107113781 A | 8/2017 |
| CN | 109963283 A | 7/2019 |
| WO | 2009000101 A1 | 12/2008 |

OTHER PUBLICATIONS

3GPP TS 25.213 V 4.0.0 (Mar. 2001) (Year: 2001).*
International Search Report and Written Opinion issued in PCT/CN2020/085992, dated Jun. 28, 2020, 12 pages.
Mediatek Inc: "Discussion on physical layer procedure", 3GPP Draft; R1-1901810, Feb. 16, 2019, total 9 pages.
Extended European Search Report issued in European Application No. 20801852.3 dated May 25, 2022 (9 pages).
Chinese Office Action issued in Chinese Application No. 201910385701.4 mailed Aug. 12, 2023.

* cited by examiner

COMMUNICATION METHOD AND APPARATUS

CROSS-REFERENCE TO RELATED APPLICATIONS

This application is a continuation of International Application No. PCT/CN2020/085992, filed on Apr. 21, 2020, which claims priority to Chinese Patent Application No. 201910385701.4, filed on May 9, 2019. The disclosures of the aforementioned applications are hereby incorporated by reference in their entireties.

TECHNICAL FIELD

This application relates to the communication field, and in particular, to a communication method and an apparatus.

BACKGROUND

In the conventional technology, downlink data transmission services provided by a wireless communication system for a terminal device may generally be classified into two types: a unicast service and a broadcast/multicast service.

Unicasting is point-to-point communication, namely, single-point communication between a network device and a terminal device. The network device may send data for each terminal device to implement a personalized service. However, when there are a large quantity of terminal devices and access traffic of the terminal devices is heavy, if all data is transmitted through unicast, the network device is overburdened. Broadcasting and multicasting can support point-to-multipoint communication, that is, a network device transmits the same data to a plurality of terminal devices, for example, a mobile phone television service. Broadcasting is the most common form. In a broadcast data transmission manner, all terminal devices located in a local area network receive data transmission, and path selection does not need to be performed for broadcasting. Therefore, network costs are relatively low, but a personalized service cannot be provided for a plurality of terminal devices that receive data. However, in multicasting, data is transmitted to a group of terminal devices, and terminal devices that require the same data stream can share one data stream, reducing network device load and providing more abundant services than that in broadcasting. However, multicasting does not have an error correction mechanism compared with unicasting (e.g., no positive acknowledgement protocol is used to confirm packet reception or require packet retransmission), and communication quality is severely affected when packet loss occurs. Therefore, a relatively robust modulation and coding scheme needs to be used, resulting in low spectral efficiency.

With increasingly wide application of broadcast and multicast communication modes, spectral efficiency of communication systems needs to be urgently improved.

SUMMARY

Embodiments of this application provide a communication method and an apparatus, to improve spectrum resource efficiency of a communication system.

According to a first aspect, a communication method is provided, where the method includes: A terminal device receives a first downlink channel, where the first downlink channel is used to carry first data. The terminal device receives a second downlink channel, where the second downlink channel is used to retransmit the first data. The first downlink channel is scrambled by using a first identifier, the second downlink channel is scrambled by using a second identifier, and the first identifier and the second identifier are identifiers configured by an access network device.

The method may be performed by a first communication apparatus. The first communication apparatus may be a communication device or a communication apparatus that can support a function required by the communication device to implement the method, for example, a chip system. For example, the communication device is a terminal device.

In this embodiment of this application, the terminal device may receive the second downlink channel when failing to receive the first downlink channel, to further obtain the first data carried on the second downlink channel, where the second downlink channel is a retransmission channel. That the first downlink channel is scrambled by using a first identifier, the second downlink channel is scrambled by using a second identifier, and the first identifier and the second identifier are identifiers configured by an access network device may be understood as that the first identifier and the second identifier are separately configured by the access network device, there is no impact on each other, and further, the first downlink channel and the second downlink channel are respectively scrambled by using different identifiers.

The communication method provided in this embodiment of this application may be applied to a retransmission mechanism and is particularly applicable to a broadcast communication system. The first downlink channel and the second downlink channel are respectively scrambled by using the first identifier and the second identifier that are independently configured, so that an initial transmission channel and a retransmission channel can be sent in areas independent of each other, and the retransmission channel does not need to be sent in a complete initial transmission area, thereby implementing a more flexible retransmission mechanism. In a scenario in which a retransmission area is less than an initial transmission area, the communication method provided in this embodiment of this application can reduce network costs and improve spectral efficiency of the communication system.

With reference to the first aspect, in a possible implementation of the first aspect, that a terminal device receiving a first downlink channel includes: The terminal device receives the first downlink channel in a first area, where the first area includes one or more cells located in a broadcast area of at least one access network device.

This may be understood as that the access network device sends the first downlink channel in the first area, to initially transmit the first data, where the first area is a sending area of the first downlink channel, the first area may be a first area set or a proper subset of the first area set, and the first area set includes all cells in a broadcast area of the access network device and all cells in a broadcast area of another access network device that may be used for retransmission. It should be noted that a location relationship between the terminal device and the first area is not limited in this embodiment of this application. In a possible case, the terminal device is located in the first area to receive the first downlink channel. In another possible case, the access network device sends the first downlink channel to the terminal device through the first area, or the access network device sends the first downlink channel in the first area.

With reference to the first aspect, in a possible implementation of the first aspect, the first identifier includes at least one of a first cell identifier and a first radio network temporary identifier, and the first cell identifier is an identifier corresponding to the first area.

The first cell identifier is an identifier corresponding to the first area. It should be noted that the first cell identifier may be a cell identifier or a virtual cell identifier and is different from a radio network temporary identifier. When the first area includes a plurality of cells or a plurality of beams, the first cell identifier may be a unified virtual identifier of the plurality of cells or the plurality of beams. When the first area includes only one cell, the first cell identifier may be a physical cell identifier of the cell.

With reference to the first aspect, in a possible implementation of the first aspect, the terminal device receives at least one of the first cell identifier and the first radio network temporary identifier, where the at least one of the first cell identifier and the first radio network temporary identifier is carried in a first broadcast message.

Specifically, the first cell identifier and the first radio network temporary identifier may be configured by using a same broadcast message or different broadcast messages, or by using a same information element (information element, IE) or different information elements in a same broadcast message. This is not limited in this embodiment of this application.

With reference to the first aspect, in a possible implementation of the first aspect, the terminal device receives the second downlink channel in a second area, where the second area includes one or more cells located in the broadcast area of the at least one access network device.

This may be understood as the second downlink channel being sent by the access network device in the second area and being used to retransmit the first data, where the second area is a retransmission area and includes the one or more cells located in the broadcast area of the at least one access network device, the second area is the first area set or the proper subset of the first area set, and the first area set includes all the cells in the broadcast area of the access network device and all the cells in the broadcast area of the another access network device that may be used for retransmission. It should be noted that a location relationship between the first area and the second area is not limited in this embodiment of this application. In a possible scenario, the second area is a subset of the first area, and the retransmission area is included in the initial transmission area. In another possible scenario, the second area may have an intersection with the first area, but is not completely included in the first area. A location relationship between the terminal device and the second area is not limited in this embodiment of this application. In a possible case, the terminal device is located in the second area to receive the second downlink channel. In another possible case, the access network device sends the second downlink channel to the terminal device through the second area, or the second downlink channel is sent in the second area.

With reference to the first aspect, in a possible implementation of the first aspect, the second identifier includes at least one of a second cell identifier and a second radio network temporary identifier, and the second cell identifier is an identifier corresponding to the second area.

The second cell identifier is an identifier corresponding to the second area. It should be noted that the second cell identifier may be a cell identifier or a virtual cell identifier and is different from a radio network temporary identifier. When the second area includes a plurality of cells or a plurality of beams, the second cell identifier may be a unified virtual identifier of the plurality of cells or the plurality of beams. When the second area includes only one cell, the second cell identifier may be a physical cell identifier of the cell.

With reference to the first aspect, in a possible implementation of the first aspect, the terminal device receives at least one of the second cell identifier and the second radio network temporary identifier, where the second cell identifier is carried in a second broadcast message, and the second radio network temporary identifier is carried in a third broadcast message or a user equipment (user equipment, UE) dedicated message.

Specifically, the second cell identifier and the second radio network temporary identifier may be configured by using a same broadcast message or different broadcast messages, or by using a same IE or different IEs in a same broadcast message. This is not limited in this embodiment of this application.

With reference to the first aspect, in a possible implementation of the first aspect, the first downlink channel and the second downlink channel are physical data channels, and the first downlink channel and the second downlink channel are sent through broadcasting.

The communication method provided in this embodiment of this application may be applied to the broadcast communication system. In this scenario, the first downlink channel and the second downlink channel are physical data channels, are sent through broadcasting, and may be mapped to a logical control channel and a logical traffic channel in different broadcast modes.

With reference to the first aspect, in a possible implementation of the first aspect, the first downlink channel is scheduled by using downlink control information (downlink control information, DCI) or configured by using higher layer signaling; and/or the second downlink channel is scheduled by using DCI.

The communication method provided in this embodiment of this application may be applied to the broadcast communication system. When the communication method is applied to a single-cell point-to-multipoint (single-cell point-to-multipoint, SC-PTM) broadcast mode or a multi-cell multipoint-to-multipoint (multi-cell multipoint-to-multipoint, MC-MTM) broadcast mode, the first downlink channel is scheduled by using DCI. When the communication method is applied to a multimedia broadcast multicast service single frequency network (multimedia broadcast multicast service single frequency network, MBSFN) broadcast mode, scheduling information of the first downlink channel is semi-statically preconfigured by using higher layer signaling. In the foregoing plurality of broadcast modes, the second downlink channel is scheduled by using DCI. Therefore, a more flexible retransmission mechanism can be implemented.

With reference to the first aspect, in a possible implementation of the first aspect, before the terminal device receives the second downlink channel, the terminal device determines a channel resource used to feed back acknowledgment information, where the channel resource is indicated by using indication information. After failing to receive the first downlink channel, the terminal device may feed back an acknowledgment to the access network device. Before this, the terminal device determines, by using the indication information, the channel resource used to feed back the acknowledgment.

In a first possible design, the channel resource used to feed back the acknowledgment corresponds to a physical cell, and the terminal device determines the corresponding channel resource based on the physical cell in which the terminal device is located.

In a second possible design, the terminal device in an RRC connected mode feeds back the acknowledgment on a channel resource indicated by dedicated signaling, where the dedicated signaling includes one of an RRC message or DCI. The terminal device in the RRC connected mode may determine, by using an indication of the dedicated signaling, the channel resource for feeding back the acknowledgment.

In a third possible design, the channel resource is a feedback channel resource corresponding to the second area, the channel resource belongs to a first resource set, and the first resource set is a set of feedback channel resources corresponding to the first area. Optionally, the first resource set is indicated by using a fourth broadcast message, the fourth broadcast message further indicates an identification information set corresponding to the first area, and a correspondence exists between identification information in the identification information set and the feedback channel resource in the first resource set. It should be noted that the identification information set and the first resource set may be configured by using a same broadcast message or different broadcast messages, or by using a same information element IE or different information elements IEs in a same broadcast message. This is not limited in this embodiment of this application.

The terminal device determines the channel resource for feeding back the acknowledgment by using at least one of the identification information set, the first resource set, and a correspondence therebetween. The correspondence exists between the identification information in the identification information set and the feedback channel resource in the first resource set. The terminal device determines, based on corresponding identification information, a feedback channel resource corresponding to the identification information, and then uses the corresponding channel resource to feed back the acknowledgment.

The method provided in this embodiment of this application may be applied to a feedback retransmission mechanism and is particularly applicable to the broadcast communication system. With reference to content in the first aspect, the terminal device may indicate the second area to the access network device by using a feedback acknowledgment, where the second area is a retransmission area. Further, the access network device may send a retransmission channel to the second area, and does not need to send a retransmission channel to an area in which no negative acknowledgment is fed back. Therefore, spectral efficiency is improved while communication quality of the system is ensured.

With reference to the first aspect, in a possible implementation of the first aspect, waveform parameters of the first downlink channel and the second downlink channel are different, and the waveform parameter includes at least one of a subcarrier spacing, a cyclic prefix (cyclic prefix, CP), and a reference signal (reference signal, RS).

The access network device sends the first downlink channel in the first area, and the access network device sends the second downlink channel in the second area. In the method provided in this embodiment of this application, the first downlink channel is used to initially transmit the first data, and a broadcast area of the first downlink channel needs to cover the first area. In a scenario in which the first area is larger, a multipath delay of data transmission is larger. Therefore, a larger CP needs to be configured for the first downlink channel. In this scenario, a corresponding subcarrier spacing and an RS time domain density are smaller. However, the second downlink channel is used to retransmit the first data to the second area. The second area is usually smaller compared with the first area. In this scenario, a smaller CP may be configured for the second downlink channel, and correspondingly a larger subcarrier spacing and a larger RS time domain density may be configured.

With reference to the first aspect, in a possible implementation of the first aspect, at least one of a first control channel for scheduling the first downlink channel and a second control channel for scheduling the second downlink channel includes a first indication field, and the first indication field is used to indicate that the second downlink channel is a retransmission channel of the first downlink channel. Therefore, the terminal device may determine a retransmission relationship between the first downlink channel and the second downlink channel based on the first indication field, to obtain the retransmission channel.

With reference to the first aspect, in a possible implementation of the first aspect, a preset or defined time sequence relationship exists between a time domain resource of the first downlink channel and a time domain resource of the second downlink channel. Therefore, the terminal device may obtain the retransmission channel by determining the time sequence relationship between the first downlink channel and the second downlink channel.

According to a second aspect, a second type of communication method is provided, where the method includes: An access network device sends a first downlink channel to a terminal device, where the first downlink channel is used to carry first data. The access network device sends a second downlink channel to the terminal device, where the second downlink channel is used to retransmit the first data. The first downlink channel is scrambled by using a first identifier, the second downlink channel is scrambled by using a second identifier, and the first identifier and the second identifier are identifiers configured by the access network device.

The method may be performed by a second communication apparatus. The second communication apparatus may be a communication device or a communication apparatus that can support a function required by the communication device to implement the method, for example, a chip system. For example, the communication device is an access network device.

In this embodiment of this application, the access network device may send the second downlink channel for carrying retransmitted data to the terminal device. Specifically, the access network device sends the first downlink channel and the second downlink channel to the terminal device, where the second downlink channel is a retransmission channel. The first downlink channel is scrambled by using a first identifier, the second downlink channel is scrambled by using a second identifier, and the first identifier and the second identifier are identifiers configured by the access network device. It may be understood that the first identifier and the second identifier are separately configured by the access network device, so there is no impact on each other, and further, the first downlink channel and the second downlink channel are respectively scrambled by using different identifiers.

The communication method provided in this embodiment of this application may be applied to a retransmission mechanism and is particularly applicable to a broadcast communication system. The first downlink channel and the second downlink channel are respectively scrambled by using the first identifier and the second identifier that are independently configured, so that an initial transmission channel and a retransmission channel can be sent in areas independent of each other, and the retransmission channel does not need to be sent in an initial transmission area, thereby implementing a more flexible retransmission mechanism. In a scenario in which a retransmission area is less than an initial transmission area, the communication method provided in this embodiment of this application can reduce network costs and improve spectral efficiency of the communication system.

With reference to the second aspect, in a possible implementation of the second aspect, the access network device sends the first downlink channel in the first area, where the first area includes one or more cells located in a broadcast area of at least one access network device.

This may be understood as that the first downlink channel is sent by the access network device in the first area and is used to initially transmit the first data, where the first area is a sending area of the first downlink channel, the first area may be a first area set or a proper subset of the first area set, and the first area set includes all cells in a broadcast area of the access network device and all cells in a broadcast area of another access network device that may be used for retransmission. It should be noted that a location relationship between the terminal device and the first area is not limited in this embodiment of this application. In a possible case, the terminal device is located in the first area to receive the first downlink channel. In another possible case, the access network device sends the first downlink channel to the terminal device through the first area, or the access network device sends the first downlink channel in the first area.

With reference to the second aspect, in a possible implementation of the second aspect, the first identifier includes at least one of a first cell identifier and a first radio network temporary identifier, and the first cell identifier is an identifier corresponding to the first area.

It should be noted that the first cell identifier may be a cell identifier or a virtual cell identifier and is different from a radio network temporary identifier. When the first area includes a plurality of cells or a plurality of beams, the first cell identifier may be a unified virtual identifier of the plurality of cells or the plurality of beams. When the first area includes only one cell, the first cell identifier may be a physical cell identifier of the cell.

With reference to the second aspect, in a possible implementation of the second aspect, the access network device sends at least one of the first cell identifier and the first radio network temporary identifier, where the at least one of the first cell identifier and the first radio network temporary identifier is carried in a first broadcast message.

Specifically, the first cell identifier and the first radio network temporary identifier may be configured by using a same broadcast message or different broadcast messages, or by using a same IE or different IEs in a same broadcast message. This is not limited in this embodiment of this application.

With reference to the second aspect, in a possible implementation of the second aspect, the access network device sends the second downlink channel in the second area, where the second area includes one or more cells located in the broadcast area of the at least one access network device.

This may be understood as the second downlink channel is sent by the access network device in the second area and is used to retransmit the first data, where the second area is a sending area of the second downlink channel and includes the one or more cells located in the broadcast area of the at least one access network device, the second area is the first area set or the proper subset of the first area set, and the first area set includes all the cells in the broadcast area of the access network device and all the cells in the broadcast area of the another access network device that may be used for retransmission. It should be noted that a location relationship between the first area and the second area is not limited in this embodiment of this application. In a possible scenario, the second area is a subset of the first area, and the retransmission area is included in the initial transmission area. In another possible scenario, the second area may have an intersection with the first area, but is not completely included in the first area. A location relationship between the terminal device and the second area is not limited in this embodiment of this application. In a possible case, the terminal device is located in the second area to receive the second downlink channel. In another possible case, the access network device sends the second downlink channel to the terminal device through the second area, or the second downlink channel is sent in the second area.

With reference to the second aspect, in a possible implementation of the second aspect, the second identifier includes at least one of a second cell identifier and a second radio network temporary identifier, and the second cell identifier is an identifier corresponding to the second area.

The second cell identifier is an identifier corresponding to the second area. It should be noted that the second cell identifier may be a cell identifier or a virtual cell identifier and is different from a radio network temporary identifier. When the second area includes a plurality of cells or a plurality of beams, the second cell identifier may be a unified virtual identifier of the plurality of cells or the plurality of beams. When the second area includes only one cell, the second cell identifier may be a physical cell identifier of the cell.

With reference to the second aspect, in a possible implementation of the second aspect, the access network device sends at least one of the second cell identifier and the second radio network temporary identifier to the terminal device, where the second cell identifier is carried in a second broadcast message, and the second radio network temporary identifier is carried in a third broadcast message or a UE dedicated message.

Specifically, the second cell identifier and the second radio network temporary identifier may be configured by using a same broadcast message or different broadcast messages, or by using a same IE or different IEs in a same broadcast message. This is not limited in this embodiment of this application.

With reference to the second aspect, in a possible implementation of the second aspect, the first downlink channel and the second downlink channel are physical data channels, and the first downlink channel and the second downlink channel are sent through broadcasting.

The communication method provided in this embodiment of this application may be applied to the broadcast communication system. In this scenario, the first downlink channel and the second downlink channel are physical data channels, are sent through broadcasting, and may correspond to a logical control channel and a logical traffic channel in different broadcast modes.

With reference to the second aspect, in a possible implementation of the second aspect, the first downlink channel is scheduled by using downlink control information DCI or configured by using higher layer signaling; and/or the second downlink channel is scheduled by using DCI.

The communication method provided in this embodiment of this application may be applied to the broadcast communication system. When the communication method is applied to an SC-PTM broadcast mode or an MC-MTM broadcast mode, the first downlink channel is scheduled by using DCI. When the communication method is applied to an MBSFN broadcast mode, scheduling information of the first downlink channel is semi-statically configured by using higher layer signaling. In the foregoing plurality of broadcast modes, the second downlink channel is scheduled by using DCI. Therefore, a more flexible retransmission mechanism can be implemented.

With reference to the second aspect, in a possible implementation of the second aspect, before the access network device sends the second downlink channel to the terminal device, the access network device sends indication information to the terminal device, where the indication information is used to indicate a channel resource for feeding back acknowledgment information by the terminal device.

After receiving the acknowledgment from the terminal device, the access network device may determine the second area based on the channel resource that carries the acknowledgment, where the second area is a retransmission area.

In a first possible design, the channel resource used to feed back the acknowledgment corresponds to a physical cell, and the access network device determines the second area based on the physical cell corresponding to the feedback channel resource.

In a second possible design, the access network device sends dedicated signaling to the terminal device in an RRC connected mode, where the dedicated signaling is used to indicate a feedback channel resource of the terminal device, and the dedicated signaling includes one of an RRC message or DCI. After receiving the acknowledgment, the access network device may determine the second area based on the channel resource that carries the acknowledgment.

In a first possible design, the channel resource is a feedback channel resource corresponding to the second area, the channel resource belongs to a first resource set, and the first resource set is a set of feedback channel resources corresponding to the first area. Optionally, the first resource set is indicated by using a fourth broadcast message, the fourth broadcast message further indicates an identification information set corresponding to the first area, and a correspondence exists between identification information in the identification information set and the feedback channel resource in the first resource set. It should be noted that the identification information set and the first resource set may be configured by using a same broadcast message or different broadcast messages, or by using a same information element IE or different information elements IEs in a same broadcast message. This is not limited in this embodiment of this application.

After receiving the acknowledgment, the access network device determines corresponding identification information by using the channel resource for feeding back the acknowledgment, and further determines the second area corresponding to the identification information. Further, with reference to content in the second aspect, the access network device may send the second downlink channel to the second area, to implement a feedback retransmission mechanism, thereby improving robustness of the communication system. According to the communication method provided in this embodiment of this application, the access network device does not need to send a retransmission channel to an area in which no negative acknowledgment is fed back. Therefore, spectral efficiency is improved while communication quality of the system is ensured.

With reference to the second aspect, in a possible implementation of the second aspect, waveform parameters of the first downlink channel and the second downlink channel are different, and the waveform parameter includes at least one of a subcarrier spacing, a cyclic prefix (cyclic prefix, CP), and a reference signal (reference signal, RS).

In the method provided in this embodiment of this application, the first downlink channel is used to initially transmit the first data, and a broadcast area of the first downlink channel needs to cover the first area. In a scenario in which the first area is larger, a multipath delay of data transmission is larger. Therefore, a larger CP needs to be configured for the first downlink channel. In this scenario, a corresponding subcarrier spacing and an RS time domain density are smaller. However, the second downlink channel is used to retransmit the first data to the second area. The second area is usually smaller compared with the first area. In this scenario, a smaller CP may be configured for the second downlink channel, and correspondingly a larger subcarrier spacing and a larger RS time domain density may be configured.

With reference to the second aspect, in a possible implementation of the second aspect, at least one of a first control channel for scheduling the first downlink channel and a second control channel for scheduling the second downlink channel includes a first indication field, and the first indication field is used to indicate that transmission on the second downlink channel is retransmission for the first downlink channel. Therefore, the access network device may indicate a retransmission relationship between the first downlink channel and the second downlink channel based on the first indication field, to implement the retransmission mechanism.

With reference to the second aspect, in a possible implementation of the second aspect, a preset or defined time sequence relationship exists between a time domain resource of the first downlink channel and a time domain resource of the second downlink channel. Therefore, the access network device may indicate, by using the time sequence relationship, that the second downlink channel is a retransmission channel of the first downlink channel.

According to a third aspect, a third type of communication method is provided, where the method includes: A terminal device receives a first downlink channel, where the first downlink channel is used to carry first data. The terminal device determines a channel resource used to feed back acknowledgment information, where the channel resource is indicated by using indication information.

The method may be performed by a third communication apparatus. The third communication apparatus may be a communication device or a communication apparatus that can support a function required by the communication device to implement the method, for example, a chip system. For example, the communication device is a terminal device.

The communication method provided in this embodiment of this application may be applied to a feedback mechanism. After failing to receive the first downlink channel, the terminal device may feed back an acknowledgment to the access network device, and a channel resource carrying the acknowledgment is indicated by using indication information.

With reference to the third aspect, in a possible implementation of the third aspect, the channel resource used to feed back the acknowledgment corresponds to a physical cell, and the terminal device determines the corresponding channel resource based on the physical cell or identification information of the physical cell.

With reference to the third aspect, in a possible implementation of the third aspect, the terminal device in an RRC connected mode feeds back an acknowledgment on a channel resource indicated by dedicated signaling, where the dedicated signaling includes one of an RRC message or DCI. The terminal device in the RRC connected mode may determine, by using an indication of the dedicated signaling, the channel resource for feeding back the acknowledgment.

With reference to the third aspect, in a possible implementation of the third aspect, the channel resource is a feedback channel resource corresponding to a second area, the channel resource belongs to a first resource set, and the first resource set is a set of feedback channel resources corresponding to the first area. Optionally, the first resource set is indicated by using a fourth broadcast message, the fourth broadcast message further indicates an identification information set corresponding to the first area, and a correspondence exists between identification information in the identification information set and the feedback channel resource in the first resource set. It should be noted that the identification information set and the first resource set may be configured by using a same broadcast message or different broadcast messages, or by using a same information element IE or different information elements IEs in a same broadcast message. This is not limited in this embodiment of this application.

The terminal device determines a channel resource for feeding back an acknowledgment by using at least one of the identification information set, the first resource set, and a correspondence therebetween. The correspondence exists between the identification information in the identification information set and the feedback channel resource in the first resource set. The terminal device determines, based on the corresponding identification information, the feedback channel resource corresponding to the identification information, and then uses the corresponding channel resource to feed back the acknowledgment. This method can improve robustness of the communication system.

According to a fourth aspect, a fourth type of communication method is provided, where the method includes: An access network device sends a first downlink channel to a terminal device, where the first downlink channel is used to carry first data. The access network device sends indication information to the terminal device, where the indication information is used to indicate a channel resource for feeding back acknowledgment information by the terminal device.

The method may be performed by a fourth communication apparatus. The fourth communication apparatus may be a communication device or a communication apparatus that can support a function required by the communication device to implement the method, for example, a chip system. For example, the communication device is an access network device.

With reference to the fourth aspect, in a possible implementation of the fourth aspect, the channel resource used to feed back the acknowledgment corresponds to a physical cell, and the access network device determines a second area based on the physical cell corresponding to the feedback channel resource.

With reference to the fourth aspect, in a possible implementation of the fourth aspect, the access network device sends dedicated signaling to the terminal device in an RRC connected mode, where the dedicated signaling is used to indicate a feedback channel resource of the terminal device, and the dedicated signaling includes one of an RRC message or DCI. After receiving the acknowledgment, the access network device may determine the second area based on the channel resource that carries the acknowledgment.

With reference to the fourth aspect, in a possible implementation of the fourth aspect, the channel resource is a feedback channel resource corresponding to the second area, the channel resource belongs to a first resource set, and the first resource set is a set of feedback channel resources corresponding to the first area. Optionally, the first resource set is indicated by using a fourth broadcast message, the fourth broadcast message further indicates an identification information set corresponding to the first area, and a correspondence exists between identification information in the identification information set and the feedback channel resource in the first resource set. It should be noted that the identification information set and the first resource set may be configured by using a same broadcast message or different broadcast messages, or by using a same information element IE or different information elements IEs in a same broadcast message. This is not limited in this embodiment of this application.

The communication method provided in this embodiment of this application may be applied to a feedback mechanism. The channel resource for feeding back the acknowledgment information by the terminal device is indicated, so that after receiving the acknowledgment from the terminal device, the access network device may determine a retransmission area based on the channel resource that carries the acknowledgment, thereby improving robustness of a communication system.

According to a fifth aspect, a fifth type of communication apparatus is provided. For example, the apparatus is the first communication apparatus described above. The apparatus includes a memory and at least one processor. The memory and the processor are coupled to each other, and are configured to implement the method described in the first aspect or the possible designs of the first aspect. For example, the communication apparatus is a chip disposed in a communication device. For example, the communication device is a terminal device. The memory is configured to store instructions or a program, and when the instructions or the program are/is executed by the at least one processor, the first type of communication apparatus is enabled to perform the method according to any one of the first aspect or the possible implementations of the first aspect.

The first type of communication apparatus may further include a communication interface. The communication interface may be a transceiver in the terminal device, for example, implemented by using an antenna, a feeder, and a codec in the communication apparatus. Alternatively, if the first type of communication apparatus is a chip disposed in the terminal device, the communication interface may be an input/output interface in the chip, for example, an input/output pin.

According to a sixth aspect, a second type of communication apparatus is provided. For example, the apparatus is the second communication apparatus described above. The apparatus includes a memory and at least one processor. The memory and the processor are coupled to each other, and are configured to implement the method described in the second aspect or the possible designs of the second aspect. For example, the communication apparatus is a chip disposed in a communication device. For example, the communication device is an access network device. The memory is configured to store instructions or a program, and when the instructions or the program are/is executed by the at least one processor, the second type of communication apparatus is enabled to perform the method according to any one of the second aspect or the possible implementations of the second aspect.

The second type of communication apparatus may further include a communication interface. The communication interface may be a transceiver in the access network device, for example, implemented by using an antenna, a feeder, and a codec in the communication apparatus. Alternatively, if the second type of communication apparatus is a chip disposed in the access network device, the communication interface may be an input/output interface in the chip, for example, an input/output pin.

According to a seventh aspect, a third type of communication apparatus is provided. For example, the apparatus is the third communication apparatus described above. The apparatus includes a memory and at least one processor. The memory and the processor are coupled to each other, and are configured to implement the method described in the third aspect or the possible designs of the third aspect. For example, the communication apparatus is a chip disposed in a communication device. For example, the communication device is a terminal device. The memory is configured to store instructions or a program, and when the instructions or the program are/is executed by the at least one processor, the third type of communication apparatus is enabled to perform the method according to any one of the third aspect or the possible implementations of the third aspect.

The third type of communication apparatus may further include a communication interface. The communication interface may be a transceiver in the terminal device, for example, implemented by using an antenna, a feeder, and a codec in the communication apparatus. Alternatively, if the third type of communication apparatus is a chip disposed in the terminal device, the communication interface may be an input/output interface in the chip, for example, an input/output pin.

According to an eighth aspect, a fourth type of communication apparatus is provided. For example, the apparatus is the fourth communication apparatus described above. The apparatus includes a memory and at least one processor. The memory and the processor are coupled to each other, and are configured to implement the method described in the fourth aspect or the possible designs of the fourth aspect. For example, the communication apparatus is a chip disposed in a communication device. For example, the communication device is an access network device. The memory is configured to store instructions or a program, and when the instructions or the program are/is executed by the at least one processor, the fourth type of communication apparatus is enabled to perform the method according to any one of the fourth aspect or the possible implementations of the fourth aspect.

The fourth type of communication apparatus may further include a communication interface. The communication interface may be a transceiver in the access network device, for example, implemented by using an antenna, a feeder, and a codec in the communication apparatus. Alternatively, if the fourth type of communication apparatus is a chip disposed in the access network device, the communication interface may be an input/output interface in the chip, for example, an input/output pin.

According to a ninth aspect, a fifth type of communication apparatus is provided. For example, the communication apparatus is the first communication apparatus described above. The communication apparatus is configured to perform the method according to any one of the first aspect or the possible implementations of the first aspect. Specifically, the communication apparatus may include modules configured to perform the method according to any one of the first aspect or the possible implementations of the first aspect, for example, include a processing module and a transceiver module. For example, the communication apparatus is a terminal device.

The transceiver module is configured to receive a first downlink channel and a second downlink channel from an access network device. In a possible implementation, the transceiver module is further configured to send an acknowledgment to the access network device.

The processing module obtains first data based on a first identifier after the transceiver module receives the first downlink channel. In a possible implementation, the processing module is further configured to determine a channel resource used to feed back acknowledgment information.

For technical effects of the ninth aspect or the possible implementations of the ninth aspect, refer to the descriptions of the technical effects of the first aspect or the corresponding implementations of the first aspect.

According to a tenth aspect, a sixth type of communication apparatus is provided. For example, the communication apparatus is the second communication apparatus described above. The communication apparatus is configured to perform the method according to any one of the second aspect or the possible implementations of the second aspect. Specifically, the communication apparatus may include modules configured to perform the method according to any one of the second aspect or the possible implementations of the second aspect, for example, include a processing module and a transceiver module. For example, the communication apparatus is an access network device.

The transceiver module is configured to send a first downlink channel and a second downlink channel to a terminal device. In a possible implementation, the transceiver module is further configured to receive a negative acknowledgment from the terminal device. Further, the processing module determines a location of the terminal device based on a channel resource of the negative acknowledgment.

It may be understood that the processing module in this embodiment of this application may be implemented by a processor or a processor-related circuit component, and the transceiver module may be implemented by a transceiver or a transceiver-related circuit component.

For technical effects of the tenth aspect or the possible implementations of the tenth aspect, refer to the descriptions of the technical effects of the second aspect or the corresponding implementations of the second aspect.

According to an eleventh aspect, a seventh type of communication apparatus is provided. For example, the communication apparatus is the third communication apparatus described above. The communication apparatus is configured to perform the method according to any one of the third aspect or the possible implementations of the third aspect. Specifically, the communication apparatus may include modules configured to perform the method according to any one of the third aspect or the possible implementations of the third aspect, for example, include a processing module and a transceiver module. For example, the communication apparatus is a terminal device.

The transceiver module is configured to receive a first downlink channel from an access network device, and send an acknowledgment to the access network device.

The processing module obtains first data based on a first identifier after the transceiver module receives the first downlink channel. The processing module is further configured to determine a channel resource used to feed back acknowledgment information.

It may be understood that the processing module in this embodiment of this application may be implemented by a processor or a processor-related circuit component, and the transceiver module may be implemented by a transceiver or a transceiver-related circuit component.

For technical effects of the eleventh aspect or the possible implementations of the eleventh aspect, refer to the descriptions of the technical effects of the third aspect or the corresponding implementations of the third aspect.

According to a twelfth aspect, an eighth type of communication apparatus is provided. For example, the communication apparatus is the fourth communication apparatus described above. The communication apparatus is configured to perform the method according to any one of the fourth aspect or the possible implementations of the fourth aspect. Specifically, the communication apparatus may include modules configured to perform the method according to any one of the fourth aspect or the possible implementations of the fourth aspect, for example, include a processing module and a transceiver module. For example, the communication apparatus is an access network device.

The transceiver module is configured to send a first downlink channel to a terminal device, and receive a negative acknowledgment from the terminal device.

The processing module is configured to determine a location of the terminal device based on a channel resource of the negative acknowledgment.

It may be understood that the processing module in this embodiment of this application may be implemented by a processor or a processor-related circuit component, and the transceiver module may be implemented by a transceiver or a transceiver-related circuit component.

For technical effects of the twelfth aspect or the possible implementations of the twelfth aspect, refer to the descriptions of the technical effects of the fourth aspect or the corresponding implementations of the fourth aspect.

According to a thirteenth aspect, a ninth type of communication apparatus is provided. For example, the apparatus is the first communication apparatus described above. The apparatus includes a communication interface and at least one processor, and the communication interface is connected to the at least one processor, and is configured to implement the method described in the first aspect or the possible designs of the first aspect. For example, the communication apparatus is a chip disposed in a communication device. For example, the communication device is a terminal device.

The communication interface is configured to obtain a program or instructions, and the processor enables, by running the program or the instructions, the first type of communication apparatus to perform the method according to any one of the first aspect or the possible implementations of the first aspect. The communication interface may be a transceiver in the terminal device, for example, implemented by using an antenna, a feeder, and a codec in the communication apparatus. Alternatively, if the first type of communication apparatus is a chip disposed in the terminal device, the communication interface may be an input/output interface in the chip, for example, an input/output pin. The processor may be an independent semiconductor chip, or may be integrated with another circuit to constitute a semiconductor chip. For example, the processor may constitute a system on chip (system on chip, SoC) with another circuit (for example, an encoding/decoding circuit, a hardware acceleration circuit, or various buses and interface circuits). Alternatively, the processor may be integrated into an application-specific integrated circuit (application-specific integrated circuit, ASIC) as a built-in processor of the ASIC, and the ASIC integrated with the processor may be independently packaged or may be packaged with another circuit. The processor includes a core configured to perform an operation or processing by executing software instructions, and may further include a necessary hardware accelerator, for example, a field programmable gate array (field programmable gate array, FPGA), a programmable logic device (programmable logic device, PLD), or a logic circuit that implements a special-purpose logic operation.

According to a fourteenth aspect, a tenth type of communication apparatus is provided. For example, the apparatus is the second communication apparatus described above. The apparatus includes a communication interface and at least one processor, and the communication interface is connected to the at least one processor, and is configured to implement the method described in the second aspect or the possible designs of the second aspect. For example, the communication apparatus is a chip disposed in a communication device. For example, the communication device is an access network device.

The communication interface is configured to obtain a program or instructions, and the processor enables, by running the program or the instructions, the first type of communication apparatus to perform the method according to any one of the second aspect or the possible implementations of the second aspect. The communication interface may be a transceiver in the access network device, for example, implemented by using an antenna, a feeder, and a codec in the communication apparatus. Alternatively, if the first type of communication apparatus is a chip disposed in the access network device, the communication interface may be an input/output interface in the chip, for example, an input/output pin. The processor may be an independent semiconductor chip, or may be integrated with another circuit to constitute a semiconductor chip. For example, the processor may constitute a system on chip (system on chip, SoC) with another circuit (for example, an encoding/decoding circuit, a hardware acceleration circuit, or various buses and interface circuits). Alternatively, the processor may be integrated into an application-specific integrated circuit (application specific integrated circuit, ASIC) as a built-in processor of the ASIC, and the ASIC integrated with the processor may be independently packaged or may be packaged with another circuit. The processor includes a core configured to perform an operation or processing by executing software instructions, and may further include a necessary hardware accelerator, for example, a field programmable gate array (field programmable gate array, FPGA), a programmable logic device (programmable logic device, PLD), or a logic circuit that implements a special-purpose logic operation.

According to a fifteenth aspect, an eleventh type of communication apparatus is provided. For example, the apparatus is the third communication apparatus described above. The apparatus includes a communication interface and at least one processor, and the communication interface is connected to the at least one processor, and is configured to implement the method described in the third aspect or the possible designs of the third aspect. For example, the communication apparatus is a chip disposed in a communication device. For example, the communication device is a terminal device.

The communication interface is configured to obtain a program or instructions, and the processor enables, by running the program or the instructions, the first type of communication apparatus to perform the method according to any one of the third aspect or the possible implementations of the third aspect. The communication interface may be a transceiver in the terminal device, for example, implemented by using an antenna, a feeder, and a codec in the communication apparatus. Alternatively, if the first type of communication apparatus is a chip disposed in the terminal device, the communication interface may be an input/output interface in the chip, for example, an input/output pin. The processor may be an independent semiconductor chip, or may be integrated with another circuit to constitute a semiconductor chip. For example, the processor may constitute a system on chip (system on chip, SoC) with another circuit (for example, an encoding/decoding circuit, a hardware acceleration circuit, or various buses and interface circuits). Alternatively, the processor may be integrated into an application-specific integrated circuit (application specific integrated circuit, ASIC) as a built-in processor of the ASIC, and the ASIC integrated with the processor may be independently packaged or may be packaged with another circuit. The processor includes a core configured to perform an operation or processing by executing software instructions, and may further include a necessary hardware accelerator, for example, a field programmable gate array (field programmable gate array, FPGA), a programmable logic device (programmable logic device, PLD), or a logic circuit that implements a special-purpose logic operation.

According to a sixteenth aspect, a twelfth type of communication apparatus is provided. For example, the apparatus is the first communication apparatus described above. The apparatus includes a communication interface and at least one processor, and the communication interface is connected to the at least one processor, and is configured to implement the method described in the fourth aspect or the possible designs of the fourth aspect. For example, the communication apparatus is a chip disposed in a communication device. For example, the communication device is an access network device.

The communication interface is configured to obtain a program or instructions, and the processor enables, by running the program or the instructions, the first type of communication apparatus to perform the method according to any one of the fourth aspect or the possible implementations of the fourth aspect. The communication interface may be a transceiver in the access network device, for example, implemented by using an antenna, a feeder, and a codec in the communication apparatus. Alternatively, if the first type of communication apparatus is a chip disposed in the access network device, the communication interface may be an input/output interface in the chip, for example, an input/output pin. The processor may be an independent semiconductor chip, or may be integrated with another circuit to constitute a semiconductor chip. For example, the processor may constitute a system on chip (system on chip, SoC) with another circuit (for example, an encoding/decoding circuit, a hardware acceleration circuit, or various buses and interface circuits). Alternatively, the processor may be integrated into an application-specific integrated circuit (application specific integrated circuit, ASIC) as a built-in processor of the ASIC, and the ASIC integrated with the processor may be independently packaged or may be packaged with another circuit. The processor includes a core configured to perform an operation or processing by executing software instructions, and may further include a necessary hardware accelerator, for example, a field programmable gate array (field programmable gate array, FPGA), a programmable logic device (programmable logic device, PLD), or a logic circuit that implements a special-purpose logic operation.

According to a seventeenth aspect, a computer storage medium is provided. The computer-readable storage medium stores instructions. When the instructions are run on a computer, the computer is enabled to perform the method according to any one of the first aspect or the possible designs of the first aspect.

According to an eighteenth aspect, a computer storage medium is provided. The computer-readable storage medium stores instructions. When the instructions are run on a computer, the computer is enabled to perform the method according to any one of the second aspect or the possible designs of the second aspect.

According to a nineteenth aspect, a computer storage medium is provided. The computer-readable storage medium stores instructions. When the instructions are run on a computer, the computer is enabled to perform the method according to any one of the third aspect or the possible designs of the third aspect.

According to a twentieth aspect, a computer storage medium is provided. The computer-readable storage medium stores instructions. When the instructions are run on a computer, the computer is enabled to perform the method according to any one of the fourth aspect or the possible designs of the fourth aspect.

According to a twenty-first aspect, a computer program product including instructions is provided. The computer program product stores the instructions. When the computer program product runs on a computer, the computer is enabled to perform the method according to any one of the first aspect or the possible designs of the first aspect.

According to a twenty-second aspect, a computer program product including instructions is provided. The computer program product stores the instructions. When the computer program product runs on a computer, the computer is enabled to perform the method according to any one of the second aspect or the possible designs of the second aspect.

According to a twenty-third aspect, a computer program product including instructions is provided. The computer program product stores the instructions. When the computer program product runs on a computer, the computer is enabled to perform the method according to any one of the third aspect or the possible designs of the third aspect.

According to a twenty-fourth aspect, a computer program product including instructions is provided. The computer program product stores the instructions. When the computer program product runs on a computer, the computer is enabled to perform the method according to any one of the fourth aspect or the possible designs of the fourth aspect.

DESCRIPTION OF EMBODIMENTS

Figure 1:
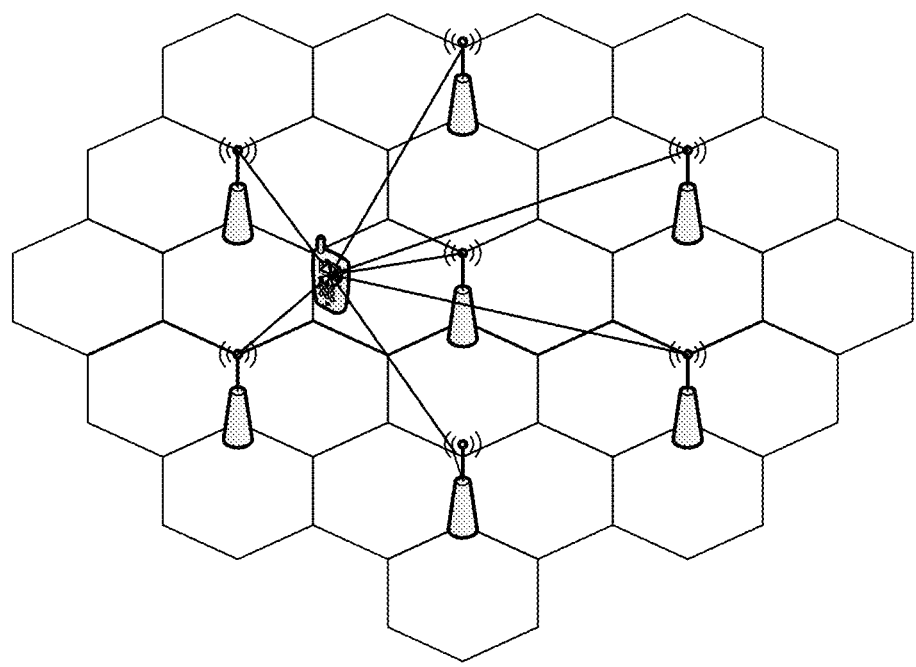
FIG. 1 is a schematic diagram of a broadcast mode in a conventional technology.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may be aware that the technical solutions provided in the embodiments of this application are also applicable to similar technical problems as the network architecture evolves and new service scenarios emerge.

In descriptions of the embodiments of this application, "at least one" refers to one or more, and "a plurality of" refers to two or more. The term "and/or" describes an association relationship for describing associated objects and represents that three relationships may exist. For example, A and/or B may represent the following three cases: Only A exists, both A and B exist, and only B exists, where A and B may be singular or plural. The character "/" generally indicates an "or" relationship between the associated objects. "At least one item (piece) of the following" or a similar expression thereof refers to any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural.

In addition, unless otherwise stated, in the embodiments of this application, ordinal numbers such as "first" and "second" are used to distinguish between a plurality of objects, and are not intended to limit an order, a time sequence, a priority, or importance of the plurality of objects. For example, a first identifier and a second identifier are identifiers with different meanings, but do not indicate different content, priorities, importance, or the like of the two identifiers.

In the following, some terms of the embodiments of this application are described, to help a person skilled in the art have a better understanding.

A terminal device includes a device that provides a user with voice and/or data connectivity, for example, may include a handheld device having a wireless connection function, or a processing device connected to a wireless modem. The terminal device may communicate with a core network through a radio access network (radio access network, RAN) and exchange voice and/or data with the RAN. The terminal device may include user equipment (user equipment, UE), a wireless terminal device, a mobile terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (which is also referred to as a "cellular" phone), a computer having a mobile terminal device, a portable, pocket-sized, handheld, computer built-in, or vehicle-mounted apparatus, a smart wearable device, and the like. For example, the terminal device is a device such as a personal communications service (personal communications service, PCS) phone, a cordless phone, a session initiation protocol (session initiation protocol, SIP) phone, a wireless local loop (wireless local loop, WLL) station, or a personal digital assistant (personal digital assistant, PDA). The terminal device further includes a limited device, for example, a device with low power consumption, a device with a limited storage capability, or a device with a limited computing capability. For example, the terminal device may be an information sensing device, for example, a barcode, radio frequency identification (radio frequency identification, RFID), a sensor, a global positioning system (global positioning system, GPS), or a laser scanner. A specific technology and a specific device form that are used by the terminal device are not limited in the embodiments of this application. For ease and brevity of description, UE is used as an example for the terminal device in the following description.

In different systems, an access network device corresponds to different devices. For example, in a second generation (2nd generation, 2G) communication system, a RAN device may include a base station and a base station controller. In a third generation (3rd generation, 3G) communication system, a RAN device may include a base station and a radio network controller (radio network controller, RNC); include an evolved base station (NodeB, eNB, or e-NodeB, evolved NodeB) in a long term evolution (long term evolution, LTE) system or a long term evolution-advanced (long term evolution-advanced, LTE-A) system; may include a next generation node B (next generation node B, gNB) in a fifth generation (the 5th generation, 5G) new radio (new radio, NR) system; or may include a centralized unit (centralized unit, CU) and a distributed unit (distributed unit, DU) in a cloud radio access network (cloud radio access network, Cloud RAN) system. A new network side device may correspond to a future evolved or emerging system. This is not limited in the embodiments of this application.

The communication method provided in the embodiments of this application is applied to a broadcast/multicast mode in communication systems such as a 5G new radio (new radio, NR) communication system and a long term evolution (long term evolution, LTE) communication system. The following describes some terms in the embodiments of this application, to facilitate understanding by a person skilled in the art.

There are two broadcast/multicast service modes in an LTE communication system: a multimedia broadcast multicast service (multimedia broadcast multicast service, MBMS) mode and a single-cell point-to-multipoint (single-cell point-to-multipoint, SC-PTM) mode.

The MBMS broadcast mode provides a point-to-multipoint multimedia data transmission mechanism. As shown in FIG. 1, a plurality of cells in broadcast areas of neighboring base stations generally form an MBMS area. A same service is sent on a same time-frequency resource in cells in a same MBMS area, to improve transmission signal strength of the MBMS, and to improve reception strength of a terminal device (terminal equipment, TE) located in an edge cell. A broadcast area in an MBMS mode needs to be statically planned in advance. A size of the area and a quantity of covered cells are relatively fixed and an order of magnitude is large. Service content transmitted in the area is also statically configured. Consequently, flexible and dynamic area adjustment cannot be performed based on a location of the terminal device and a required service. Currently, the MBMS mode has some disadvantages. In one aspect, because of a static configuration of the MBMS area, all control information of the MBMS area is carried in radio resource control (radio resource control, RRC) signaling, and currently there is no channel state information (channel state information, CSI) feedback and hybrid automatic repeat request (hybrid automatic repeat request, HARQ) feedback for the MBMS mode. Consequently, scheduling parameters such as a resource configuration and a modulation and coding scheme cannot be flexibly and dynamically adjusted. In another aspect, for UE located in the MBMS area and not required to receive a broadcast service, the base station still needs to send a broadcast service to the UE on a broadcast resource, causing a serious waste of resources.

In the MBSFN broadcast mode, the access network device configures a multicast control channel (multicast control channel, MCCH) of the MBSFN by using a system information block (system information block, SIB), including information required for receiving the MCCH, and including at least one of a time domain position of the MCCH, an area identifier, and a modulation and coding scheme (modulation and coding scheme, MCS). The MCCH carries information required for receiving a multicast traffic channel (multicast traffic channel, MTCH), including configuration information of the MTCH, for example, at least one of a temporary mobile group identity (temporary mobile group identity, TMGI), a session identifier (session ID), a time domain position of the MTCH, and an MCS. The UE receives, based on the configuration information, a physical channel PMCH, and obtains service data carried on the PMCH. It should be noted that the two logical channels MCCH and MTCH are both mapped to the PMCH at a physical layer, and the PMCH carries service data in the MTCH.

Figure 2:
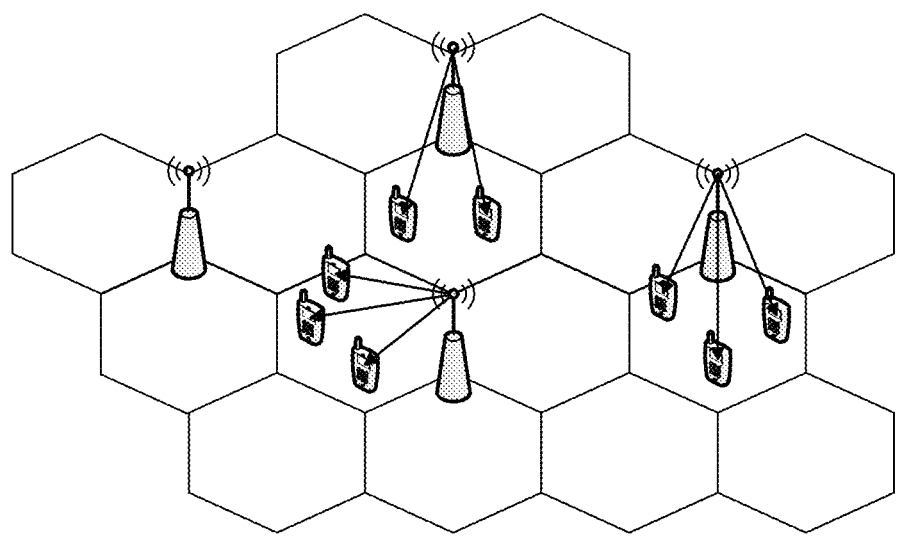
FIG. 2 is a schematic diagram of another broadcast mode in the conventional technology.

The SC-PTM broadcast mode supports providing a broadcast service in a single cell. As shown in FIG. 2, a base station may perform broadcasting or multicasting for a group of UEs in a cell. In the SC-PTM mode, services do not need to be synchronously transmitted in a plurality of cells. A granularity of multicast cell planning in the SC-PTM mode may be a physical cell, which can be configured based on a UE location and a service requirement. Compared with large area planning of the MBMS, planning in the SC-PTM mode is more flexible. In addition, control information of the SC-PTM mode is carried in physical layer signaling, for example, downlink control information (downlink control information, DCI). Therefore, dynamic scheduling can be supported. In the SC-PTM mode, scheduling parameters such as a resource configuration and a modulation and coding scheme can be flexibly adjusted. In addition, a service in the SC-PTM mode can further be dynamically switched to a unicast service. However, the SC-PTM mode has the following disadvantages: First, the SC-PTM mode supports only single-cell point-to-multipoint. Consequently, mobility is insufficiently supported. When UE is handed over between different cells, service continuity of the UE may be affected. Second, coverage of a single cell is relatively small, and further there is a low probability that a plurality of UEs share a broadcast service. Consequently, gains of the SC-PTM mode are not obvious compared with those in unicast transmission. Third, minimum signal-to-noise ratios of all served UEs in the cell need to be ensured in the SC-PTM mode. The SC-PTM mode has little gain compared with unicast transmission. In some scenarios, spectral efficiency of the SC-PTM mode is even lower than that of unicast transmission. In addition, no feedback mechanism is introduced in the SC-PTM mode currently.

In the SC-PTM broadcast mode, the access network device configures a single-cell multicast control channel (single-cell multicast control channel, SC-MCCH) by using a SIB, including a time domain position of the SC-MCCH. SC-PTM configuration information carried on the SC-MCCH includes configuration information of a single-cell multicast traffic channel (single-cell multicast traffic channel, SC-MTCH). The configuration information includes a TMGI, a session ID, a G-RNTI used to scramble DCI, and time domain discontinuous reception (discontinuous reception. DRX) configuration information. It should be noted that the two logical channels SC-MCCH and SC-MTCH are both mapped to a PDSCH at a physical layer, and the DCI is carried on a physical downlink control channel (physical downlink control channel, PDCCH). The terminal device obtains, by detecting the DCI scrambled by the G-RNTI, a physical downlink channel PDSCH scheduled by using the DCI, and further obtains service data carried on the PDSCH.

A 5G NR system is a next-generation wireless communication system of an LTE system, and has better and more flexible forward compatibility than the LTE system. The multi-cell multipoint-to-multipoint (multi-cell multipoint-to-multipoint, MC-MTM) broadcast mode can be obtained through extension based on SC-PTM. The MC-MTM mode has the following features: First, an MC-MTM broadcast/multicast area includes a plurality of cells and may be dynamically planned based on a UE location and a required service. A configuration in the MC-MTM mode is more flexible compared with static large area planning in the MBMS mode. Second, the MC-MTM broadcast/multicast area includes a plurality of cells, and a coverage area thereof is larger than a coverage area in the SC-PTM mode. Therefore, a probability that a plurality of UEs share a broadcast service is relatively high, and further service continuity of the UEs is relatively stable when a cell handover occurs. Third, in the MC-MTM mode, single frequency networks (single frequency networks, SFNs) may be applied to form a multimedia broadcast multicast service single frequency network (multimedia broadcast multicast service single frequency network, MBSFN) to transmit a broadcast service. In this way, a signal-to-noise ratio is improved. This resolves a problem that spectral efficiency is low because minimum signal-to-noise ratios of all served UEs in the cell need to be ensured in the SC-PTM mode.

In the MC-MTM broadcast mode, the access network device configures a multi-cell multicast control channel (multi-cell multicast control channel, MC-MCCH) of the MC-MTM by using a SIB, which includes a time domain position of the MC-MCCH, and is used to specify a time domain position at which the UE receives the MC-MCCH. The MC-MTM configuration information carried on the MC-MCCH includes configuration information of a multi-cell multicast traffic channel (multi-cell multicast traffic channel, MC-MTCH). The configuration information includes a temporary TMGI, a session ID, a G-RNTI used to scramble DCI, a scrambling code identifier used to scramble a PDSCH, a cell list of the MC-MTCH, and DRX configuration information. It should be noted that the two logical channels MC-MCCH and MC-MTCH are both mapped to a PDSCH at a physical layer, and the DCI is carried on a physical downlink control channel (physical downlink control channel, PDCCH). The UE obtains, by detecting the DCI scrambled by the G-RNTI, a physical downlink channel PDSCH scheduled by using the DCI, and further obtains service data carried on the PDSCH.

Compared with the SC-PTM broadcast mode in which a cell identifier is used to scramble the PDSCH in a configuration procedure, in the MC-MTM broadcast mode, a configuration procedure of a scrambling code identifier of the PDSCH is added. PDSCHs of a plurality of cells or a plurality of beams located in the MC-MTM broadcast area are scrambled by using a same scrambling code identifier, so that signals of the plurality of cells or the plurality of beams may be combined at a physical layer, thereby enhancing a signal-to-noise ratio. In addition, a cell list configuration is further added to the MC-MTM broadcast mode. When the UE is handed over between cells in the broadcast area, the UE may determine, based on the cell list, that the UE is located in a same MC-MTM area, and that the foregoing configuration procedure does not need to be performed again. Broadcast data may be seamlessly received directly in the broadcast area, to improve broadcast service continuity. It should be noted that the MC-MTM broadcast mode may be switched to the SC-PTM broadcast mode by adjusting the configuration procedure. For example, the scrambling code identifier of the PDSCH is no longer configured, or the scrambling code identifier is configured to a physical cell identifier of a cell in which the UE is located.

Currently, no feedback mechanism is introduced in the foregoing broadcast/multicast modes. Therefore, a relatively robust modulation and coding scheme needs to be used, resulting in relatively low spectral efficiency of a system. Embodiments of this application provide a signal sending method to implement a feedback and retransmission mechanism. The method may be applied to the foregoing broadcast/multicast modes, to improve spectral efficiency of a broadcast system.

For ease of understanding, the following specifically describes the communication method provided in the embodiments of this application with reference to the accompanying drawings.

Embodiment 1

Figure 3:
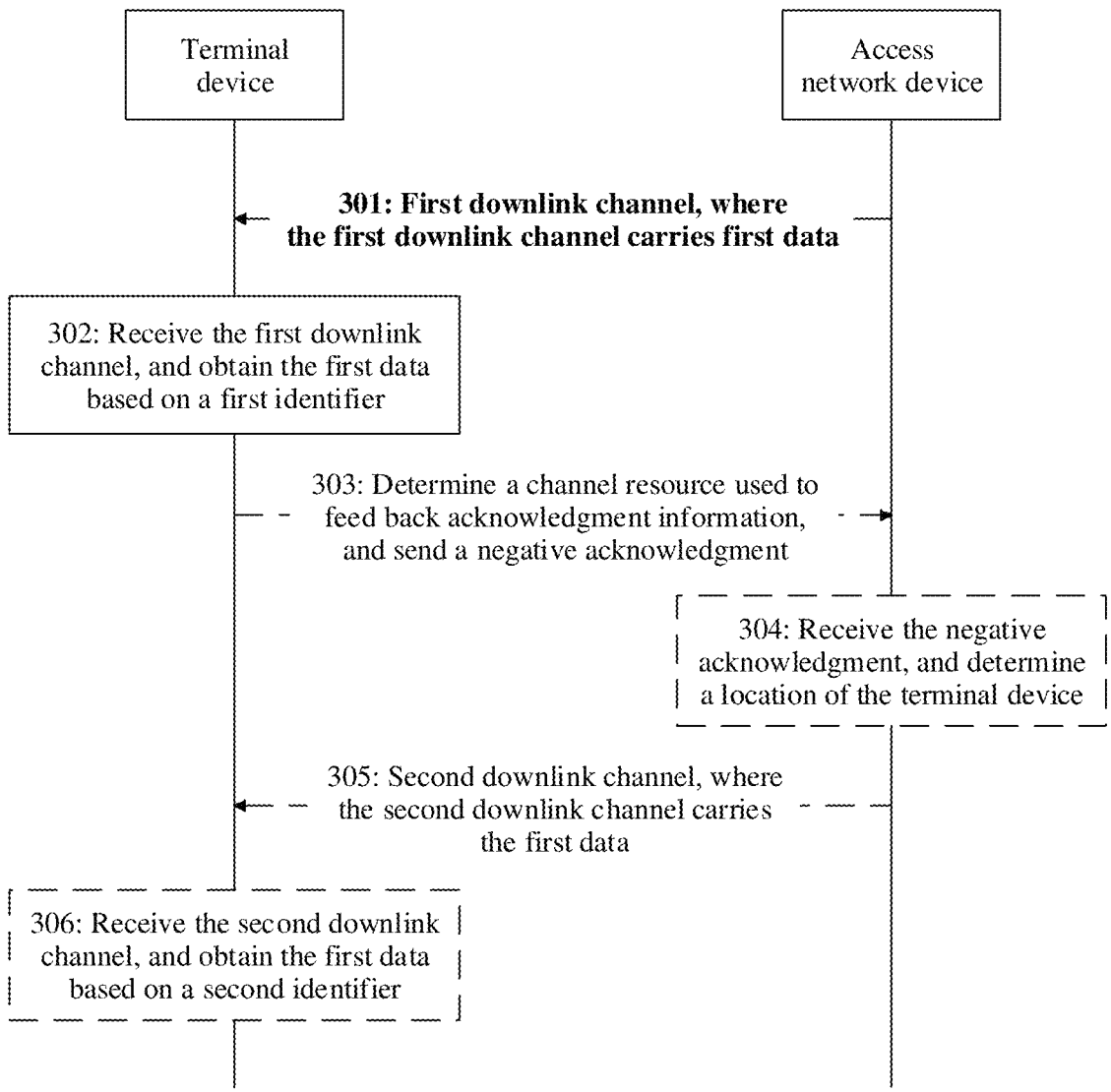
FIG. 3 is a schematic diagram of signal interaction applicable to a communication method according to an embodiment of this application.

As shown in FIG. 3, an embodiment of this application provides a communication method, including steps 301 to 306. The communication method includes a signal sending method.

301: An access network device sends a first downlink channel to a terminal device, where the first downlink channel is used to carry first data, and the first downlink channel is scrambled by using a first identifier.

302: The terminal device receives the first downlink channel. Further, the terminal device obtains, based on the first identifier, the first data carried on the first downlink channel.

In an optional design, the method further includes step 303: The terminal device determines a channel resource used to feed back acknowledgment information, and the terminal device sends a negative acknowledgment to the access network device.

Further, the method further includes step 304: The access network device receives the negative acknowledgment from the terminal device, and the access network device determines a second area based on the channel resource of the negative acknowledgment, where the second area is a retransmission area.

The communication method provided in step 301 to step 304 may be applied to a feedback mechanism. When failing to receive the first downlink channel, the terminal device may determine, by using at least one of a first resource set, an identification information set, and a correspondence therebetween, the channel resource carrying the acknowledgment, and the terminal device feeds back the acknowledgment to the access network device. The access network device determines the corresponding second area by using identification information corresponding to the channel resource carrying the negative acknowledgment. The access network device may learn of a transmission status of the first data by using the communication method provided in this embodiment of this application, to improve robustness of a communication system.

In an optional design, the method further includes step 305: The access network device sends a second downlink channel to the terminal device, where the second downlink channel is used to retransmit the first data, the second downlink channel is scrambled by using a second identifier, and the first identifier and the second identifier are identifiers configured by the access network device.

Further, the method further includes step 306: The terminal device receives the second downlink channel, where the second downlink channel is used to retransmit the first data; and the terminal device obtains the first data based on the second identifier.

The communication method provided in step 301, step 302, step 305, and step 306 may be applied to a retransmission mechanism. The access network device sends the first downlink channel to a first area, where the first downlink channel carries the first data. The access network device sends the second downlink channel to the second area, where the second downlink channel is used to retransmit the first data. In a scenario in which the second area is less than the first area, the access network device may send a retransmission channel to a local area, to reduce load of the network device while ensuring communication quality, and improve spectral efficiency of the communication system.

It should be noted herein that execution of step 305 does not depend on step 303. After step 301 and step 302, step 303 and step 305 may be performed independently or in combination, and whether an association relationship exists between step 303 and step 305 is determined based on a specific solution.

The communication method provided in step 301 to step 306 may be applied to the feedback and retransmission mechanism. After failing to receive the first downlink channel, the terminal device may feed back the acknowledgment to the access network device, and further obtain the retransmission channel, to ensure communication quality. The access network device may determine the retransmission area by using the channel resource for feeding back the acknowledgment. Further, the access network device sends the retransmission channel to the local area, but does not need to send retransmission information to an initial transmission area. Therefore, spectral efficiency of the communication system is improved.

In step 301, the access network device sends the first downlink channel to the terminal device, where the first downlink channel is used to carry the first data, and the first downlink channel is scrambled by using the first identifier.

In a possible implementation, the first identifier includes at least one of a first cell identifier and a first radio network temporary identifier, the first cell identifier is an identifier corresponding to the first area, and the first area includes one or more cells located in a broadcast area of at least one access network device. Specifically, the first area is a first area set or a proper subset of the first area set, and the first area set includes all cells in a broadcast area of the access network device and all cells in a broadcast area of another access network device that may be used for retransmission. It should be noted that the first cell identifier is a cell identifier or a virtual cell identifier and is different from a radio network temporary identifier. For example, when the first identifier includes the first cell identifier and the first radio network temporary identifier, the first identifier may be represented as follows:

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}$$

$c_{init}$ represents the first identifier used to scramble the first downlink channel, q is a codeword, $n_s$ is a slot identifier, $n_{RNTI}$ represents the first radio network temporary identifier RNTI, and $N_{ID}^{cell}$ and $N_{ID}^{MBSFN}$ are each a first cell identifier corresponding to a corresponding broadcast mode. When the broadcast area is one cell, the first cell identifier may correspond to a physical cell identifier. When the broadcast area is a plurality of cells, the first cell identifier may correspond to a unified virtual cell identifier of the plurality of cells. Further, optionally, the at least one of the first cell identifier and the first radio network temporary identifier is carried in a first broadcast message. Specifically, the first cell identifier and the first radio network temporary identifier may be configured by using a same broadcast message or different broadcast messages, or by using a same information element (information element. IE) or different information elements in a same broadcast message. This is not limited in this embodiment of this application.

It should be noted that the first downlink channel is used to transmit the first data to the first area. In a possible case, the terminal device is located in the first area to receive the first downlink channel. In another possible case, the terminal device is not located in the first area, and the access network device sends the first downlink channel to the terminal device through the first area, or the access network device sends the first downlink channel in the first area. A location relationship between the terminal device and the first area is not limited in this embodiment of this application.

The communication method provided in this embodiment of this application may be applied to a plurality of broadcast modes, which are separately described below.

In a first possible implementation, the method is applied to a multi-cell multipoint-to-multipoint (multi-cell multipoint-to-multipoint, MC-MTM) broadcast mode. The first downlink channel is a physical downlink shared channel (physical downlink shared channel, PDSCH), and the first identifier includes at least one of a group radio network temporary identifier (group radio network temporary identifier, G-RNTI) and the first cell identifier. According to the method provided in this embodiment of this application, the access network device sends the PDSCH to the terminal device, where the PDSCH is used to carry the first data, and the PDSCH is scrambled by using at least one of the G-RNTI and the first cell identifier.

Optionally, the first cell identifier is a scrambling code identifier used to scramble the first downlink channel. Further, optionally, the first cell identifier is a cell identifier of a broadcast area, and the broadcast area includes a plurality of cells or a plurality of beams. Further, the first cell identifier corresponds to a physical cell identifier of one cell or a unified identifier of a plurality of cells. In this embodiment of this application, the first cell identifier used to scramble the PDSCH is configured for the plurality of cells, so that the plurality of cells or the plurality of beams in the MC-MTM broadcast area may be scrambled by using the unified first cell identifier. In this manner, signals of the plurality of cells or the plurality of beams may be combined at a physical layer, to enhance a signal-to-noise ratio.

Optionally, the G-RNTI and the first cell identifier are configured by using a broadcast message, and the G-RNTI and the first cell identifier may be configured by using a same broadcast message or different broadcast messages, or by using a same IE or different IEs in a same broadcast message. This is not limited in this embodiment of this application.

Specifically, the access network device configures a multi-cell multicast control channel (multi-cell multicast control channel, MC-MCCH) of the MC-MTM by using a system information block (system information block, SIB), including time domain position information of the MC-MCCH. MC-MTM configuration information carried by the MC-MCCH includes configuration information of a multi-cell multicast traffic channel (multi-cell multicast traffic channel, MC-MTCH). The configuration information includes a temporary mobile group identity (temporary mobile group identity, TMGI), a session identifier (session ID), a G-RNTI used to scramble downlink control information (downlink control information, DCI), a scrambling code identifier used to scramble a PDSCH, a cell list of the MC-MTCH, and time domain discontinuous reception (discontinuous reception, DRX) configuration information. It should be noted that the two logical channels MC-MCCH and MC-MTCH are both mapped to a same PDSCH at a physical layer, and the DCI is carried on a physical downlink control channel (physical downlink control channel, PDCCH).

Optionally, the first downlink channel PDSCH is scheduled by using the DCI, and a cyclic redundancy code (cyclic redundancy code, CRC) of the DCI is scrambled by using the G-RNTI.

In a second possible implementation, the method is applied to a multimedia broadcast multicast service single frequency network (multimedia broadcast multicast service single frequency network. MBSFN) broadcast mode. The first downlink channel is a physical multicast channel (physical multicast channel, PMCH), and the first identifier is the first cell identifier. According to the method provided in this embodiment of this application, the access network device sends the PMCH to the terminal device, where the PMCH is used to carry the first data, and the PMCH is scrambled by using the first cell identifier.

Optionally, the first cell identifier is a cell identifier of a broadcast area, and the broadcast area includes at least one cell or beam. Further, when the broadcast area includes one cell, the first cell identifier is a physical cell identifier corresponding to the cell. When the broadcast area includes a plurality of cells or a plurality of beams, the first cell identifier is a unified identifier of the plurality of cells or the plurality of beams.

Optionally, the first cell identifier is configured by using a broadcast message.

Specifically, the access network device configures a multicast control channel (multicast control channel, MCCH) of the MBSFN by using a SIB, including information required for receiving the MCCH, for example, a time domain position of the MCCH, the first cell identifier, and a modulation and coding scheme (modulation and coding scheme, MCS) of the MCCH. The MCCH carries information required for receiving a multicast traffic channel (multicast traffic channel, MTCH), including configuration information of the MTCH, for example, at least one of a TMGI, a session ID, a time domain position of the MTCH, or an MCS of the MTCH. It should be noted that the two logical channels MCCH and MTCH are both mapped to a same PMCH at a physical layer, and the PMCH carries service data in the MTCH.

Optionally, the first downlink channel PMCH is semi-statically configured by using higher layer signaling, where the higher layer signaling includes broadcast signaling and radio resource control (radio resource control, RRC) dedicated signaling.

In a third possible implementation, the method is applied to a single-cell point-to-multipoint (single-cell point-to-multipoint, SC-PTM) broadcast mode. The first downlink channel is a PDSCH, and the first identifier is at least one of a G-RNTI and the first cell identifier. According to the method provided in this embodiment of this application, the access network device sends the PDSCH to the terminal device, where the PDSCH is used to carry the first data, and the PDSCH is scrambled by using at least one of the G-RNTI and the first cell identifier.

Optionally, the first cell identifier is a physical cell identifier of a corresponding cell.

Optionally, both the G-RNTI and the scrambling code identifier are configured by using a broadcast message, and the G-RNTI and the scrambling code identifier may be configured by using a same broadcast message or different broadcast messages, or by using a same IE or different IEs in a same broadcast message. This is not limited in this embodiment of this application.

Specifically, the access network device configures a single-cell multicast control channel (single-cell multicast control channel, SC-MCCH) of the SC-PTM by using a SIB, including configuring time domain position information of the SC-MCCH. SC-PTM configuration information carried on the SC-MCCH includes configuration information of a single-cell multicast traffic channel (single-cell multicast traffic channel, SC-MTCH). The configuration information includes a TMGI, a session ID, a G-RNTI used to scramble DCI, and DRX configuration information. It should be noted that the two logical channels SC-MCCH and SC-MTCH are mapped to a same PDSCH at a physical layer, and the DCI is carried on a PDCCH.

Optionally, the first downlink channel PDSCH is scheduled by using the DCI, and a CRC of the DCI is scrambled by using the G-RNTI.

It should be noted that the configuration method described in this embodiment of this application is merely an example, and another similar configuration procedure is not excluded. In addition, the communication method may be further applied to another possible broadcast mode. Details are not described herein again.

In step 302, the terminal device receives the first downlink channel, where the first downlink channel is used to carry the first data, and further the terminal device obtains the first data based on the first identifier.

The terminal device receives the first downlink channel in the first area, where the first area includes one or more cells located in a broadcast area of at least one access network device. Specifically, the first area is a first area set or a proper subset of the first area set, and the first area set includes all cells in a broadcast area of the access network device and all cells in a broadcast area of another access network device that may be used for retransmission.

Optionally, the terminal device receives at least one of the first cell identifier and the first radio network temporary identifier, where the at least one of the first cell identifier and the first radio network temporary identifier is carried in a first broadcast message. Specifically, the first cell identifier and the first radio network temporary identifier may be configured by using a same broadcast message or different broadcast messages, or by using a same IE or different IEs in a same broadcast message. This is not limited in this embodiment of this application.

It should be noted that the communication method provided in this embodiment of this application may be applied to a plurality of broadcast modes. The following uses the MC-MTM as an example for description. Another broadcast mode is also applicable. Details are not described herein.

In a possible implementation, the method is applied to an MC-MTM broadcast mode, and the terminal device receives the first downlink channel PDSCH and obtains the first data. Specifically, the terminal device receives, in the first area, the first downlink channel from the access network device, obtains, by detecting the DCI scrambled by using the G-RNTI, the physical downlink channel PDSCH scheduled by using the DCI, descrambles the PDSCH by using the first identifier, and then obtains the first data carried on the PDSCH, where the first data is service data of the MC-MTCH.

In step 303, the terminal device determines the channel resource used to feed back the acknowledgment information. Further, the terminal device sends the negative acknowledgment to the access network device.

In a scenario in which the terminal device fails to receive the first downlink channel, or the terminal device fails to descramble the first downlink channel after receiving the first downlink channel, or the terminal device fails to check the first data, the terminal device needs to feed back an acknowledgment to the access network device. Further, optionally, as described in step 305 and step 306, the access network device may retransmit the first data to the terminal device. In this embodiment of this application, for ease of description, the following describes, by using an example in which the first downlink channel fails to be received, a terminal device that needs to receive retransmitted data.

According to the communication method provided in this embodiment of this application, when failing to receive the first downlink channel, the terminal device may feed back an acknowledgment to the access network device by using a hybrid automatic repeat request (hybrid automatic repeat request, HARQ) mechanism. Specifically, in a first possible implementation of the HARQ mechanism, the terminal device performs no feedback when successfully receiving the first downlink channel, to avoid interference caused by excessive uplink data, and the terminal device feeds back a negative acknowledgment (negative acknowledgment, NACK) to the access network device when failing to receive the first downlink channel. In a second possible implementation of the HARQ mechanism, UE in an RRC connected mode feeds back an acknowledgment (acknowledgment, ACK) when successfully receiving the first downlink channel, and feeds back a NACK when failing to receive the first downlink channel. However, UE in an RRC idle mode feeds back a NACK only when failing to receive the first downlink channel, but does not feed back an acknowledgment when successfully receiving the first downlink channel.

Before feeding back the acknowledgment, the terminal device determines a channel resource used to feed back a NACK, where the channel resource is a feedback channel resource corresponding to the second area, the second area is a retransmission area and includes one or more cells located in the broadcast area of the at least one access network device, the second area is the first area set or the proper subset of the first area set, and the first area set includes all the cells in the broadcast area of the access network device and all the cells in the broadcast area of the another access network device that may be used for retransmission. In a possible scenario, that the second area is a subset of the first area may be understood as that the retransmission area is included in an initial transmission area. In another possible scenario, the second area may have an intersection with the first area, but is not completely included in the first area. For example, UE receives an initial transmission channel from an access network device A, where the initial transmission channel corresponds to the first area. The UE receives a retransmission channel from an access network device B, where the retransmission channel corresponds to the second area, and the second area is not included in the first area.

The terminal device determines, based on corresponding identification information, a corresponding channel resource used to feed back a NACK. Further, the terminal device feeds back an acknowledgment to the access network device by using the corresponding feedback channel resource.

In a first possible implementation, the channel resource used to feed back the acknowledgment corresponds to a physical cell. Specifically, one channel resource or one group of channel resources is/are configured for each cell to feed back an acknowledgment, and all UEs located in the cell perform a feedback by using corresponding channel resources.

In a second possible implementation, the UE in the RRC connected mode feeds back an acknowledgment on a channel resource indicated by dedicated signaling, where the dedicated signaling includes one of an RRC message and DCI. Specifically, before step 303, step 3031 is further included: The access network device indicates, to the terminal device by using the dedicated signaling, a channel resource used to feed back an acknowledgment. The terminal device may determine, after receiving the dedicated signaling, the channel resource used to feed back the acknowledgment. Further, the terminal device feeds back the acknowledgment by using the corresponding feedback channel resource.

In a third possible implementation, the channel resource used to feed back the acknowledgment is determined by using at least one of an identification information set, a first resource set, and a correspondence therebetween. Specifically, before step 303, the method further includes step 3032. The terminal device obtains the identification information set and the first resource set from the access network device. The channel resource belongs to the first resource set, the first resource set is a set of feedback channel resources corresponding to the first area or the first area set. For definitions of the first area and the first area set, refer to related descriptions in step 301. The identification information set is a set of identification information corresponding to the first area or the first area set, and different identification information corresponds to different areas. For example, the identification information may be at least one of a physical cell identifier, a synchronization signal block (synchronization signal and PBCH block, SSB) index, and a reference signal (reference signal, RS). The physical cell identifier may identify a physical cell in which the terminal device is located, the SSB index may identify an area covered by a corresponding beam, and the RS may identify a corresponding area. A correspondence exists between the identification information in the identification information set and the feedback channel resource in the first resource set. The terminal device determines, based on the identification information, the feedback channel resource corresponding to the identification information. Further, the terminal device feeds back the acknowledgment by using the corresponding channel resource.

Optionally, the identification information set and the first resource set are indicated by using a fourth broadcast message. Specifically, the identification information set and the first resource set may be configured by using a same broadcast message or different broadcast messages, or by using a same information element IE or different information elements IEs in a same broadcast message. This is not limited in this embodiment of this application.

In step 304, the access network device receives the negative acknowledgment from the terminal device. Further, the access network device determines the second area based on the channel resource of the negative acknowledgment, where the second area is the retransmission area.

After receiving the negative acknowledgment, the access network device may determine the second area based on the channel resource of the negative acknowledgment. For a definition of the second area, refer to related descriptions in step 303. Step 301 to step 304 may be applied to a feedback mechanism of a broadcast system. When failing to receive the first downlink channel from the access network device, the terminal device feeds back the negative acknowledgment to the access network device by using the corresponding feedback channel resource. After receiving the negative acknowledgment, the access network device may determine the second area based on a correspondence between channel resources. A method for determining the second area is as follows:

In a first possible implementation, the channel resource used to feed back the acknowledgment corresponds to a physical cell. Specifically, one channel resource or one group of channel resources is/are configured for each cell to feed back the acknowledgment, and UEs located in the cell perform a feedback on corresponding channel resources by using a same sequence.

Further, after receiving the negative acknowledgment from the terminal device, the access network device determines, based on a correspondence between a channel resource for the negative acknowledgment and a physical cell, the second area corresponding to the physical cell. For a definition of the second area, refer to related descriptions in step 303. It should be noted that, for each physical cell, there may be a corresponding second area, and the second area is a retransmission area of the corresponding physical cell.

In a second possible implementation, the UE in the RRC connected mode feeds back the acknowledgment on the channel resource indicated by the dedicated signaling. Specifically, before step 303, step 3031 is further included: The access network device indicates, to the terminal device by using the dedicated signaling, the channel resource used to feed back the acknowledgment.

Further, after receiving the negative acknowledgment from the UE, the access network device determines, based on the channel resource of the negative acknowledgment, the second area corresponding to the retransmission area of the UE.

In a third possible implementation, the access network device determines corresponding identification information based on a channel resource that carries the negative acknowledgment. Specifically, the channel resource belongs to a first resource set, the identification information belongs to an identification information set, and a correspondence exists between identification information in the identification information set and the feedback channel resource in the first resource set. For example, the identification information may be at least one of a physical cell identifier, an SSB index, and an RS.

Further, after receiving the negative acknowledgment from the terminal device, the access network device determines, based on the channel resource of the negative acknowledgment, the identification information corresponding to the negative acknowledgment, and further determines the second area corresponding to the identification information.

Figure 4:
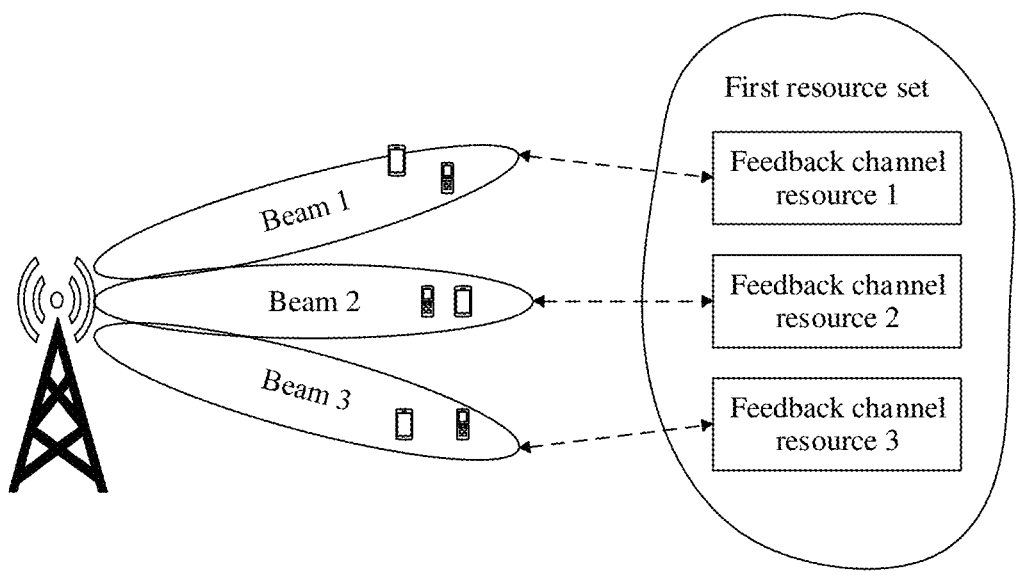
FIG. 4 is a schematic diagram of a possible feedback method according to an embodiment of this application.

For example, FIG. 4 shows a possible method for determining a feedback channel resource. The identification information set includes three SSB indexes, which are respectively an SSB 1 to an SSB 3. The first resource set includes three feedback channel resources, which are respectively a feedback channel resource 1 to a feedback channel resource 3. Elements in the identification information set are in a one-to-one correspondence with elements in the first resource set. The SSB 1 corresponds to the feedback channel resource 1, the SSB 2 corresponds to the feedback channel resource 2, and the SSB 3 corresponds to the feedback channel resource 3. Each SSB index corresponds to one beam (beam). When UE located in a beam 1 broadcast area corresponding to the SSB 1 fails to receive the first downlink channel, the UE finds, based on the identification information set and the first resource set, the feedback channel resource 1 corresponding to the SSB 1, and feeds back a NACK by using the feedback channel resource 1. After receiving the NACK carried on the feedback channel resource 1, the access network device determines, based on the feedback channel resource 1, that the identification information corresponding to the feedback channel resource 1 is the SSB 1, and further determines that retransmitted data needs to be sent only in a beam 1 direction corresponding to the SSB 1. When the access network device does not receive a NACK on another feedback channel resource, the access network device does not need to send the retransmitted data in the other two beam directions.

For another example, the identification information set includes two RSs, an RS 1 corresponds to a cell (cell) 1, and an RS 2 corresponds to a cell 2. The first resource set includes two feedback channel resources, namely, a channel resource 1 and a channel resource 2. Elements in the identification information set is in a one-to-one correspondence with elements in the first resource set, the RS 1 corresponds to the channel resource 1, and the RS 2 corresponds to the channel resource 2. When UE in the cell 1 fails to receive the first downlink channel, the UE finds the corresponding channel resource 1 based on the corresponding identification information RS 1, and feeds back a negative acknowledgment by using the channel resource 1. After receiving the NACK carried on the channel resource 1, the access network determines the corresponding RS 1 based on the channel resource 1, and further determines that the cell 1 corresponding to the RS 1 is the second area.

In step 305, the access network device sends the second downlink channel to the terminal device, where the second downlink channel is used to retransmit the first data, the second downlink channel is scrambled by using the second identifier, and the first identifier and the second identifier are identifiers configured by the access network device.

In this embodiment of this application, both the first downlink channel and the second downlink channel are physical data channels sent in a broadcast manner. The second downlink channel is a retransmission channel of the first downlink channel, or the first downlink channel is used to initially transmit the first data, and the second downlink channel is used to retransmit the first data. The first downlink channel is scrambled by using the first identifier, the second downlink channel is scrambled by using the second identifier, and the first identifier and the second identifier are identifiers configured by the access network device. It should be noted herein that the first identifier and the second identifier are two independent identifiers configured by the access network device. The independence herein means that configuration manners are independent, but specific content may be the same or different. This is not specifically limited herein.

It should be noted that the second downlink channel is sent by the access network device in the second area and is used to carry the first data, and the second area may be understood as a retransmission area. For a definition of the second area, refer to related descriptions in step 303. In a possible case, the terminal device receives the second downlink channel in the second area. In another possible case, the access network device sends the second downlink channel to the terminal device through the second area, or the access network device sends the second downlink channel in the second area. A location relationship between the terminal device and the second area is not limited in this embodiment of this application.

Optionally, the access network device that sends the second downlink channel is different from the access network device that sends the first downlink channel. For example, an access network device A sends the first downlink channel to the terminal device, and an access network device B sends the second downlink channel to the terminal device. The first downlink channel and the second downlink channel are respectively used to initially transmit and retransmit the first data. This may be understood as that the terminal device may obtain the retransmission channel by using different access network devices.

Optionally, waveform parameters of the first downlink channel and the second downlink channel are different. The waveform parameter includes at least one of a subcarrier spacing, a cyclic prefix (cyclic prefix, CP), and a reference signal (reference signal, RS). Specifically, the first downlink channel is used to initially transmit the first data, and a broadcast area of the first downlink channel needs to cover the first area. For a definition of the first area, refer to related descriptions in step 303. In a scenario in which the first area is larger, a multipath delay of data transmission is larger. Therefore, a larger CP needs to be configured for the first downlink channel. In this scenario, a corresponding subcarrier spacing and an RS time domain density are smaller. However, the second downlink channel is used to retransmit the first data to the second area. The second area is usually smaller compared with the first area. In this scenario, a smaller CP may be configured for the second downlink channel, and correspondingly a larger subcarrier spacing and a larger RS time domain density may be configured.

In a first possible implementation, at least one of a first control channel for scheduling the first downlink channel and a second control channel for scheduling the second downlink channel includes a first indication field, and the first indication field is used to indicate that transmission of the second downlink channel is retransmission for the first downlink channel. Further, the UE may determine a retransmission relationship between the first control channel and the second control channel based on the first indication field in the first control channel and the second control channel, and further obtain the first data. For example, DCI for scheduling the first downlink channel and DCI for scheduling the second downlink channel may include a HARQ process number indication field, and two downlink channels with a same HARQ process number are respectively an initial transmission channel and a retransmission channel. Further, the UE may combine received channels based on the HARQ process number, and obtain the first data.

In a second possible implementation, a preset or predefined time sequence relationship exists between a time domain resource of the first downlink channel and a time domain resource of the second downlink channel. Specifically, a time sequence-based implicit rule exists between the time domain resource of the first downlink channel and the time domain resource of the second downlink channel. The time sequence-based implicit rule is used to indicate a relationship between the initial transmission channel and the retransmission channel. Further, the UE may determine the retransmission relationship between the initial transmission channel and the retransmission channel based on the time sequence relationship, and then obtain the first data. For example, the first downlink channel is not scheduled by using DCI, and the second downlink channel is scheduled by using DCI. In this scenario, a time point at which the first data is initially transmitted on the first downlink channel may be used to correspond to a HARQ process number, and different time points correspond to different HARQ process numbers. The HARQ process number is included in the DCI for scheduling the second downlink channel to indicate that the second downlink channel is the retransmission channel of the first downlink channel. Further, the UE may determine the retransmission relationship between the first downlink channel and the second downlink channel based on the initial transmission time of the first downlink channel and the process number in the DCI for scheduling the second downlink channel, and obtain the first data.

In a third possible implementation, the first downlink channel and the second downlink channel indicate a retransmission channel by using a preset or predefined time sequence relationship. Specifically, a relationship between initial transmission and retransmission is preconfigured or predefined between two successive downlink channels within a specific time interval. In this case, the UE may determine the retransmission relationship between the first downlink channel and the second downlink channel based on transmission time of the first downlink channel and transmission time of the second downlink channel, and further obtain the first data.

In another possible implementation, based on descriptions of the foregoing three possible implementations, in a possible scenario, any two or all of the foregoing manners may be used, for the first downlink channel and the second downlink channel, to indicate a retransmission relationship between the first downlink channel and the second downlink channel.

The first identifier and the second identifier are separately configured by the access network device, and are respectively used to scramble the first downlink channel and the second downlink channel. Specifically, for the first cell identifier, refer to related descriptions in step 301. The second identifier includes at least one of a second cell identifier and a second radio network temporary identifier (radio network temporary identifier, RNTI), and the second cell identifier is an identifier corresponding to the second area. It should be noted that the second cell identifier is a cell identifier or a virtual cell identifier, instead of a radio network temporary identifier.

In a possible implementation, the second cell identifier is a physical cell identifier, and is carried by a synchronization signal of a cell corresponding to the second area. In another possible implementation, the second cell identifier is an area identifier independent of the first cell identifier, and when the second area includes a plurality of cells, the second cell identifier is a unified identifier of all cells in the second area. The second area is a retransmission area and includes the one or more cells located in the broadcast area of the at least one access network device, the second area is a first area set or a proper subset of the first area set, and the first area set includes all cells in a broadcast area of the access network device and all cells in a broadcast area of another access network device that may be used for retransmission. It should be noted that an access network device used to retransmit the first data and an access network device used to initially transmit the first data may be different devices, and all cells in a broadcast area of all access network devices that may be used for retransmission are included in the first area.

Optionally, the second cell identifier is carried in a second broadcast message, and the second RNTI is carried in a third broadcast message or a UE dedicated message. The UE dedicated message includes RRC dedicated signaling sent for the UE in the RRC connected mode. The second cell identifier and the second RNTI may be configured by using a same broadcast message or different broadcast messages, or by using a same IE or different IEs in a same broadcast message. This is not limited in this embodiment of this application.

Optionally, the second downlink channel is scheduled by using DCI, and a CRC of the DCI is scrambled by using the second RNTI. Therefore, the second downlink channel may support dynamic scheduling, and parameters such as a resource configuration and a modulation and coding scheme can be flexibly adjusted as required.

Figure 5:
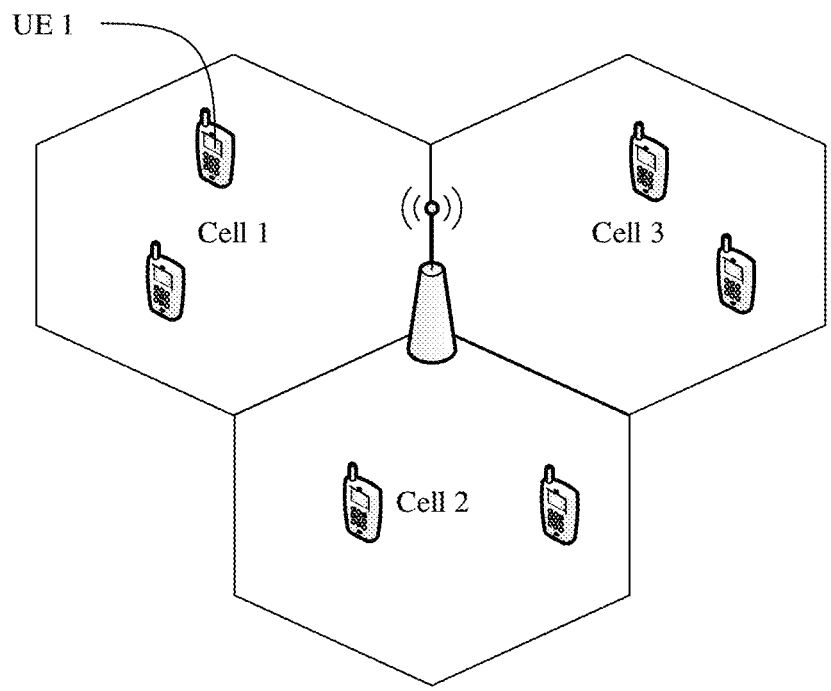
FIG. 5 is a schematic diagram of a possible retransmission method according to an embodiment of this application.

As shown in FIG. 5, a base station is used as an example of the access network device. The base station sends the first data to cells, namely, a cell 1 to a cell 3, located in the first area. It is assumed that only UE 1 located in the cell 1 fails to receive the first downlink channel. Further, the base station retransmits the first data to the second area in which the cell 1 is located, but does not need to send retransmitted data to the cell 2 and the cell 3. The retransmitted first data is carried on the second downlink channel, and the second downlink channel is scrambled by using at least one of a second cell identifier of the cell 1 and a second RNTI. The access network device may send the second downlink channel to the terminal device through broadcasting or unicasting.

In a possible implementation, the access network device sends, to the second area through broadcasting, the second downlink channel that carries the retransmitted data. Optionally, the second downlink channel is scrambled by using at least one of the second cell identifier and a G-RNTI. In this implementation, the retransmitted data may be sent to the UE in the RRC connected mode and the UE in the RRC idle mode.

In another possible implementation, the access network device sends, to the second area through unicasting, the second downlink channel that carries the retransmitted data. Optionally, the second downlink channel is scrambled by using at least one of the second cell identifier and a cell radio network temporary identifier (cell radio network temporary identifier, C-RNTI). In this implementation, the retransmitted data may be sent to the UE in the RRC connected mode.

In step 306, the terminal device receives the second downlink channel, where the second downlink channel is used to retransmit the first data; and further the terminal device obtains the first data based on the second identifier.

The terminal device receives the second downlink channel in the second area, where the second area includes one or more cells located in the broadcast area of the at least one access network device. The second downlink channel is scrambled by using the second identifier. The second identifier includes at least one of the second cell identifier and a second radio network temporary identifier, and the second cell identifier is an identifier corresponding to the second area. Further, the terminal device obtains, based on the second identifier, the first data carried on the second downlink channel. For definitions of the second downlink channel and the second identifier, refer to related descriptions in step 305.

It should be noted that, in the method provided in this embodiment of this application, steps 303 and 304 and steps 305 and 306 are optional steps, and steps 301 to 304 may be applied to a feedback mechanism, or steps 301 and 302 and steps 305 and 306 may be applied to a retransmission mechanism, or steps 301 to 306 are applied to a feedback retransmission mechanism. This is not limited in this embodiment of this application.

In a first possible implementation, the communication method provided in steps 301 to 306 may be applied to the feedback retransmission mechanism. The feedback retransmission mechanism is applicable to a broadcast communication system. The access network device determines the second area by using at least one of a first resource set, an identification information set, and a correspondence therebetween. Further, a method of combining initial broadcast transmission and data retransmission for a local area is used, so that the terminal device can obtain a retransmission channel in a plurality of broadcast modes.

Specifically, the access network device sends the first data to the first area by sending the first downlink channel, where the first downlink channel is scrambled by using the first identifier. After receiving the first downlink channel, the terminal device descrambles the first downlink channel by using the first identifier, and further obtain the first data. When failing to receive the first downlink channel, the terminal device may determine, by applying the method in step 303, a channel resource corresponding to an area in which the terminal device is located and used to feed back an acknowledgment, and send a negative acknowledgment to the access network device by using the channel resource. After receiving the negative acknowledgment, the access network device determines, based on the channel resource of the negative acknowledgment, that an area corresponding to the corresponding identification information is the second area. The access network device sends the second downlink channel to the second area, where the second downlink channel carries the first data, and the second downlink channel is scrambled by using the second identifier. After receiving the second downlink channel, the terminal device descrambles the second downlink channel by using the second identifier, and further obtain the first data. The first identifier and the second identifier are identifiers independent of each other and configured by the access network device.

In a second possible implementation, the communication method provided in steps 301 and 302 and steps 305 and 306 may be applied to the retransmission mechanism. The retransmission mechanism is applicable to a broadcast communication system. A method of combining initial broadcast transmission and data retransmission for a local area is used, so that the terminal device can obtain a retransmission channel in a plurality of broadcast modes, and improve spectral efficiency of the system. Specifically, the access network device sends the first downlink channel to the first area, where the first downlink channel carries the first data. The access network device sends the second downlink channel to the second area, where the second downlink channel is used to retransmit the first data. In a scenario in which the second area is less than the first area, the access network device may send a retransmission channel to a local area, to reduce load of the network device while ensuring communication quality, and improve spectral efficiency of a communication system.

In a third possible implementation, the communication method provided in step 301 to step 304 may be applied to the feedback mechanism. The feedback mechanism is applicable to a broadcast communication system. Specifically, after receiving a negative acknowledgment, the access network device may determine, by using at least one of the first resource set, the identification information set, and the correspondence therebetween, the identification information corresponding to the channel resource carrying the negative acknowledgment, and further determine the second area. The access network device may learn of a transmission status of the first data by using the communication method provided in this embodiment of this application, to improve robustness of a communication system.

UE is used as an example of the terminal device. In the conventional technology, a broadcast service not only serves UE in an RRC connected mode, but also serves UE in an RRC idle mode. On one hand, currently, there is no HARQ feedback mechanism for the UE in the RRC idle mode. The UE in the RRC idle mode may receive broadcast data, but does not have a feedback resource used to feed back an acknowledgment. Therefore, currently, a network side cannot perform broadcast retransmission for specified UE in an RRC idle mode. On the other hand, it is assumed that a feedback mechanism is introduced for UE in an RRC idle mode, but an acknowledgment feedback of an area or specified UE cannot be distinguished by using a feedback resource. After receiving a NACK, the network side can only retransmit the NACK in an entire broadcast area. However, an actual probability of NACK occurrence is generally 1% to 10%, which is far less than a probability of correct reception. Therefore, retransmission in the entire broadcast area is performed due to a reception failure of specific UE or a local area, greatly decreasing spectral efficiency.

The method provided in this embodiment of this application combines initial broadcast transmission for a plurality of cells or a plurality of beams and data retransmission for a local area, to provide a feedback retransmission mechanism applicable to a plurality of broadcast modes such as SC-PTM, MBSFN, and MC-MTM, thereby improving resource usage efficiency of the system. In the method provided in this embodiment of this application, the correspondence between the identification information set and the first resource set is further established, to calibrate a feedback acknowledgment of the UE, and enable the foregoing feedback retransmission mechanism.

When the modules or units are implemented by using hardware, the hardware may be any one or any combination of a CPU, a microprocessor, a DSP, an MCU, an artificial intelligence processor, an ASIC, an SoC, an FPGA, a PLD, a dedicated digital circuit, a hardware accelerator, or a non-integrated discrete component, and the hardware may run necessary software or does not depend on software, to perform the foregoing method procedures.

The following describes, with reference to the accompanying drawings, apparatuses configured to implement the foregoing methods in the embodiments of this application. Therefore, the foregoing content may be used in subsequent embodiments, and repeated content is not described.

Figure 6:
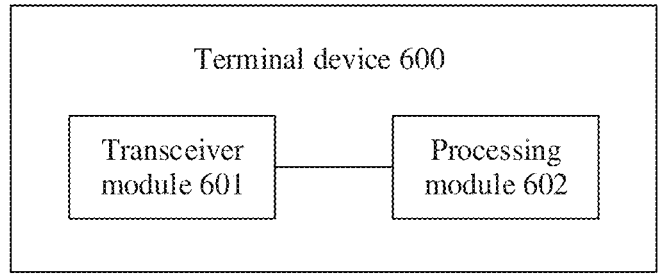
FIG. 6 is a schematic block diagram of a terminal device according to an embodiment of this application.

FIG. 6 is a schematic block diagram of an apparatus 600 according to an embodiment of this application. For example, the apparatus 600 is a terminal device 600. The terminal device 600 includes a processing module 601 and a transceiver module 602. The processing module 601 may be configured to perform all operations, except receiving and sending operations, performed by the terminal device in the embodiment shown in FIG. 3, for example, that the terminal device descrambles a first downlink channel and obtains first data, and the method in step 303, and/or configured to support another process of the technology described in this specification. The transceiver module 602 may be configured to perform all receiving and sending operations, for example, step 302 and step 306, performed by the terminal device in the embodiment shown in FIG. 3, and/or configured to support another process of the technology described in this specification.

The transceiver module 602 is configured to receive a first downlink channel from an access network device, where the first downlink channel is used to carry first data.

The processing module 601 is configured to: after the transceiver module 602 receives the first downlink channel, obtain the first data based on a first identifier.

In an optional implementation, the processing module 601 is further configured to determine a channel resource used to feed back acknowledgment information. Further, the transceiver module 602 sends a negative acknowledgment to the access network device.

In an optional implementation, the transceiver module 602 is further configured to receive a second downlink channel, where the second downlink channel is used to retransmit the first data. Further, the processing module 601 obtains the first data based on a second identifier.

It should be understood that the processing module 601 in this embodiment of this application may be implemented by a processor or a processor-related circuit component, and the transceiver module 602 may be implemented by a transceiver or a transceiver-related circuit component.

Figure 7:
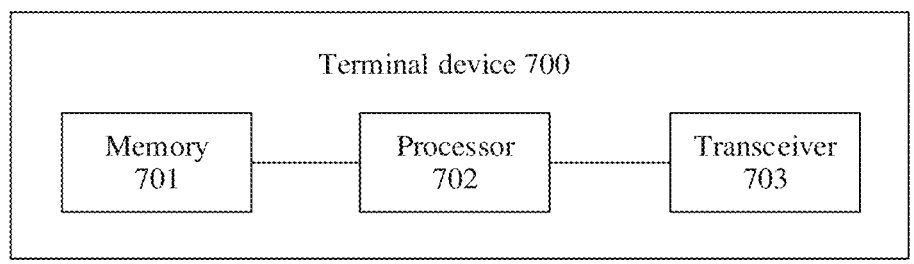
FIG. 7 is another schematic block diagram of a terminal device according to an embodiment of this application.

As shown in FIG. 7, an embodiment of this application further provides a communication device 700. For example, the communication device 700 is a terminal device 700. The terminal device 700 includes a processor 701, a memory 702, and a transceiver 703. The memory 702 stores instructions or a program. The processor 701 is configured to execute the instructions or the program stored in the memory 702. When the instructions or the program stored in the memory 702 are/is executed, the processor 701 is configured to perform the operations performed by the processing module 601 in the foregoing embodiment, and the transceiver 703 is configured to perform the operations performed by the transceiver module 602 in the foregoing embodiment.

It should be understood that the terminal device 600 or the terminal device 700 in the embodiments of this application may correspond to the terminal device in the embodiment shown in FIG. 3, and operations and/or functions of the modules in the terminal device 600 or the terminal device 700 are respectively used to implement corresponding procedures in the embodiment shown in FIG. 3. For brevity, details are not described herein again.

Figure 8:
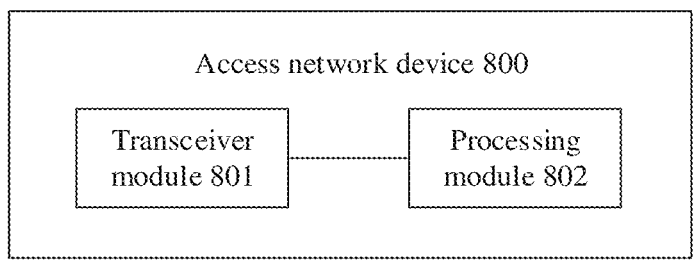
FIG. 8 is a schematic block diagram of an access network device according to an embodiment of this application.

FIG. 8 is a schematic block diagram of a communication device 800 according to an embodiment of this application. For example, the communication device 800 is an access network device 800. The access network device 800 includes a processing module 801 and a transceiver module 802. The processing module 801 may be configured to perform all operations, for example, the communication method in step 304, except receiving and sending operations, performed by the access network device in the embodiment shown in FIG. 3, and/or configured to support another process of the technology described in this specification. The transceiver module 802 may be configured to perform all receiving and sending operations, for example, the communication method in step 301 and step 305, performed by the access network device in the embodiment shown in FIG. 3, and/or configured to support another process of the technology described in this specification.

The transceiver module 802 is configured to send a first downlink channel to a terminal device, where the first downlink channel is used to carry first data, and the first downlink channel is scrambled by using a first identifier.

In an optional implementation, the transceiver module 802 is further configured to receive a negative acknowledgment from the terminal device. Further, the processing module 801 determines a location of the terminal device based on a channel resource of the negative acknowledgment.

In an optional implementation, the transceiver module 802 is further configured to send a second downlink channel to the terminal device, where the second downlink channel is used to retransmit the first data, and the second downlink channel is scrambled by using a second identifier.

It should be understood that the processing module 801 in this embodiment of this application may be implemented by a processor or a processor-related circuit component, and the transceiver module 802 may be implemented by a transceiver or a transceiver-related circuit component.

Figure 9:
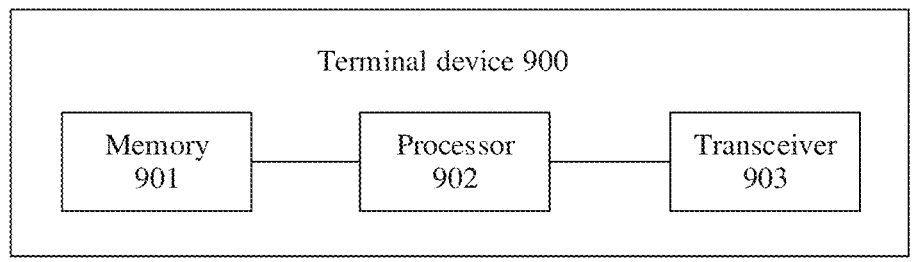
FIG. 9 is another schematic block diagram of an access network device according to an embodiment of this application.

As shown in FIG. 9, an embodiment of this application further provides a communication device 900. For example, the communication device 900 is an access network device 900. The access network device 900 includes a processor 901, a memory 902, and a transceiver 903. The memory 902 stores instructions or a program. The processor 901 is configured to execute the instructions or the program stored in the memory 902. When the instructions or the program stored in the memory 902 are/is executed, the processor 901 is configured to perform the operations performed by the processing module 801 in the foregoing embodiment, and the transceiver 903 is configured to perform the operations performed by the transceiver module 802 in the foregoing embodiment.

It should be understood that the access network device 800 or the access network device 900 in the embodiments of this application may correspond to the access network device in the embodiment shown in FIG. 3, and operations and/or functions of the modules in the access network device 800 or the access network device 900 are respectively used to implement corresponding procedures in the embodiment shown in FIG. 3. For brevity, details are not described herein again.

An embodiment of this application further provides a communication apparatus. The communication apparatus may be a terminal device, or may be an apparatus in the terminal device, for example, an integrated circuit or a chip. The communication apparatus may be configured to perform an action performed by the terminal device in the foregoing method embodiment shown in FIG. 3.

Figure 10:
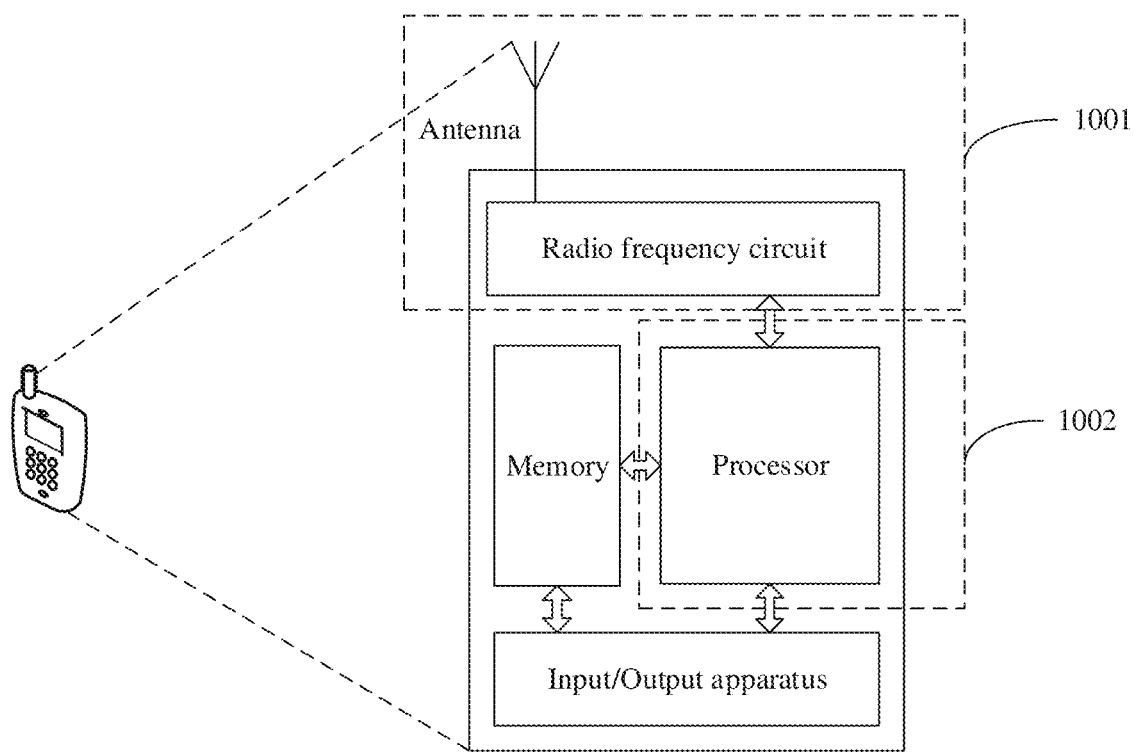
FIG. 10 is a schematic block diagram of a communication apparatus according to an embodiment of this application.

When the communication apparatus is a terminal device, FIG. 10 is a simplified schematic structural diagram of the terminal device. For ease of understanding and convenience of illustration, an example in which the terminal device is a mobile phone is used in FIG. 10. As shown in FIG. 10, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and the data. The radio frequency circuit is mainly configured to perform conversion between a baseband signal and a radio frequency signal, and process the radio frequency signal. The antenna is mainly configured to receive and send a radio frequency signal in an electromagnetic wave form. The input/output apparatus, for example, a touchscreen, a display screen, or a keyboard, is mainly configured to receive data entered by a user and output data to the user. It should be noted that some types of terminal devices may have no input/output apparatus.

When data needs to be sent, the processor performs baseband processing on the to-be-sent data, and then outputs a baseband signal to the radio frequency circuit. The radio frequency circuit performs radio frequency processing on the baseband signal, and then sends a radio frequency signal in an electromagnetic wave form through the antenna. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 10 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna having a sending and receiving function and the radio frequency circuit may be considered as a transceiver unit of the terminal device, and the processor having a processing function may be considered as a processing unit of the terminal device. As shown in FIG. 10, the terminal device includes a transceiver unit 1001 and a processing unit 1002. The transceiver unit may also be referred to as a transceiver, a transceiver machine, a transceiver apparatus, or the like. The processing unit may also be referred to as a processor, a processing board, a processing module, a processing apparatus, and the like. Optionally, a component that is in the transceiver unit 1001 and that is configured to implement a reception function may be considered as a receiving unit, and a component that is in the transceiver unit 1001 and that is configured to implement a sending function may be considered as a sending unit. In other words, the transceiver unit 1001 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receiving circuit, or the like. The sending unit sometimes may also be referred to as a transmitter machine, a transmitter, a transmitter circuit, or the like.

It should be understood that the transceiver unit 1001 is configured to perform sending and receiving operations on a terminal device side in the method embodiment shown in FIG. 3, and the processing unit 1002 is configured to perform an operation other than the sending and receiving operations on the terminal device side in the method embodiment shown in FIG. 3.

For example, in an implementation, the transceiver unit 1001 is configured to perform the receiving and sending steps, for example, 302 and 306, on the terminal device side in the embodiment shown in FIG. 3, and/or configured to support another process of the technology described in this specification. The processing unit 1002 is configured to perform another operation, for example, 303, other than the transceiver operation, on the terminal device side in the embodiment shown in FIG. 3, and/or configured to support another process of the technology described in this specification.

When the communication apparatus is a chip, the chip includes a transceiver unit and a processing unit. The transceiver unit may be an input/output circuit or a communication interface. The processing unit may be a processor, a microprocessor, or an integrated circuit, integrated on the chip.

Figure 11:
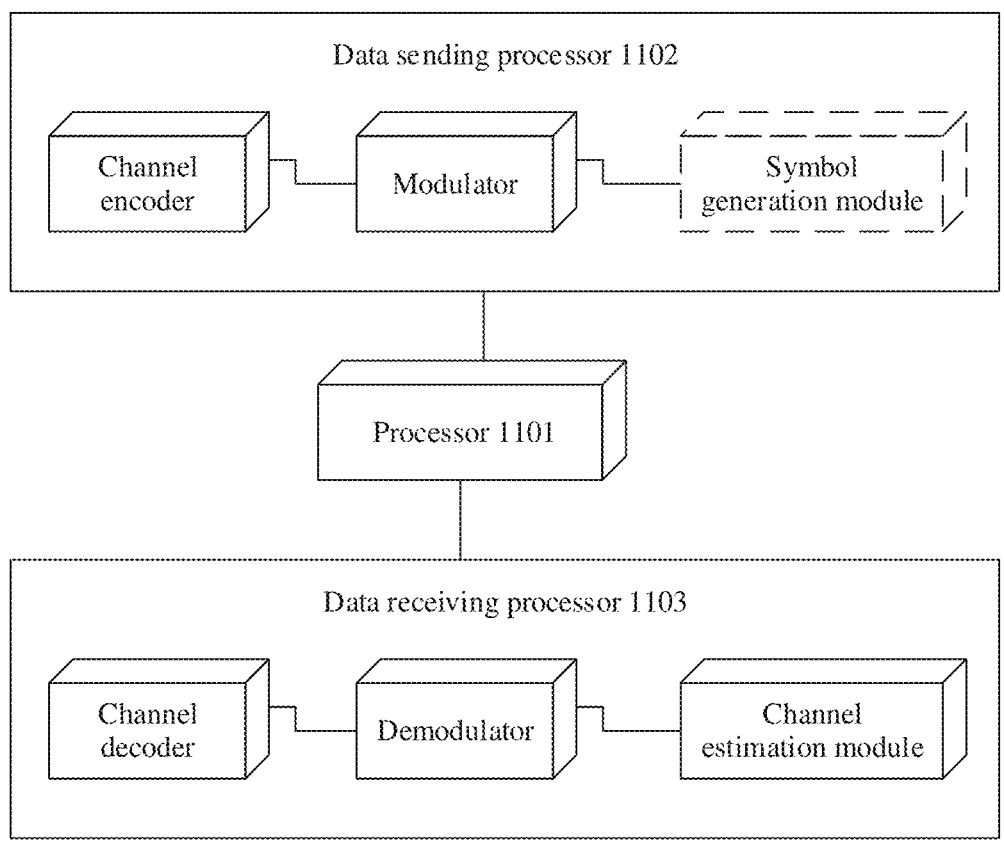
FIG. 11 is another schematic block diagram of a communication apparatus according to an embodiment of this application.

When the communication apparatus in this embodiment of this application is the terminal device, reference may be made to a device shown in FIG. 11. In an example, the device may implement a function similar to that of the processor 1101 in FIG. 11. In FIG. 11, the device includes a processor 1101, a data sending processor 1102, and a data receiving processor 1103. The processing module 601 in the foregoing embodiment may be the processor 1101 in FIG. 11, and completes a corresponding function. The transceiver module 602 in the foregoing embodiment may be the data sending processor 1102 and/or the data receiving processor 1103 in FIG. 11.

Although FIG. 11 shows a channel encoder and a channel decoder, it may be understood that the modules do not constitute a limitation on this embodiment, and are merely an example.

Figure 12:
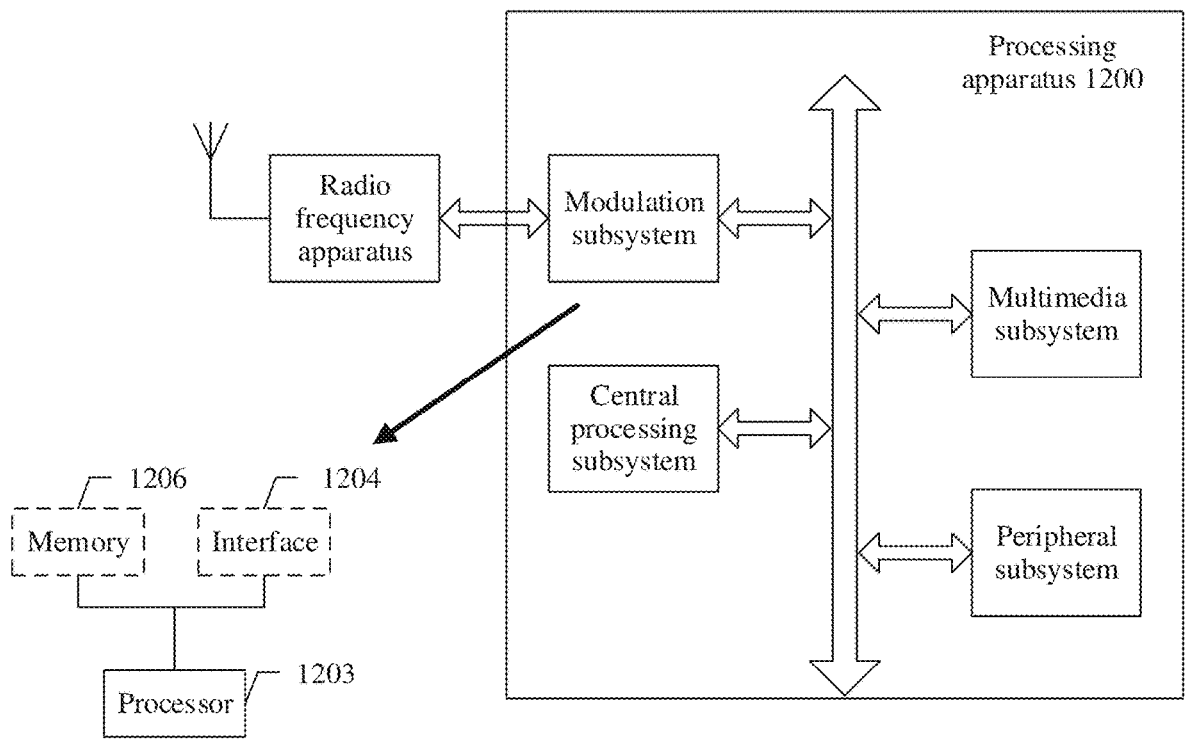
FIG. 12 is still another schematic block diagram of a communication apparatus according to an embodiment of this application.

FIG. 12 shows another form of this embodiment. A processing apparatus 1200 includes modules such as a modulation subsystem, a central processing subsystem, and a peripheral subsystem. The communication apparatus in this embodiment may be used as the modulation subsystem in the processing apparatus. Specifically, the modulation subsystem may include a processor 1203 and an interface 12011. The processor 1203 completes a function of the processing module 601, and the interface 12011 completes a function of the transceiver module 602. In another variation, the modulation subsystem includes a memory 1206, a processor 1203, and a program that is stored in the memory 1206 and that can be run on the processor. When executing the program, the processor 1203 implements the method on the terminal device side in the foregoing method embodiment shown in FIG. 3. It should be noted that the memory 1206 may be non-volatile or volatile. The memory 1206 may be located inside the modulation subsystem, or may be located in the processing apparatus 1200, provided that the memory 1206 can be connected to the processor 1203.

An embodiment of this application further provides a communication apparatus. The communication apparatus may be an access network device, or may be an apparatus in the access network device, for example, an integrated circuit or a chip. The communication apparatus may be configured to perform an action performed by the access network device in the method embodiment shown in FIG. 3.

Figure 13:
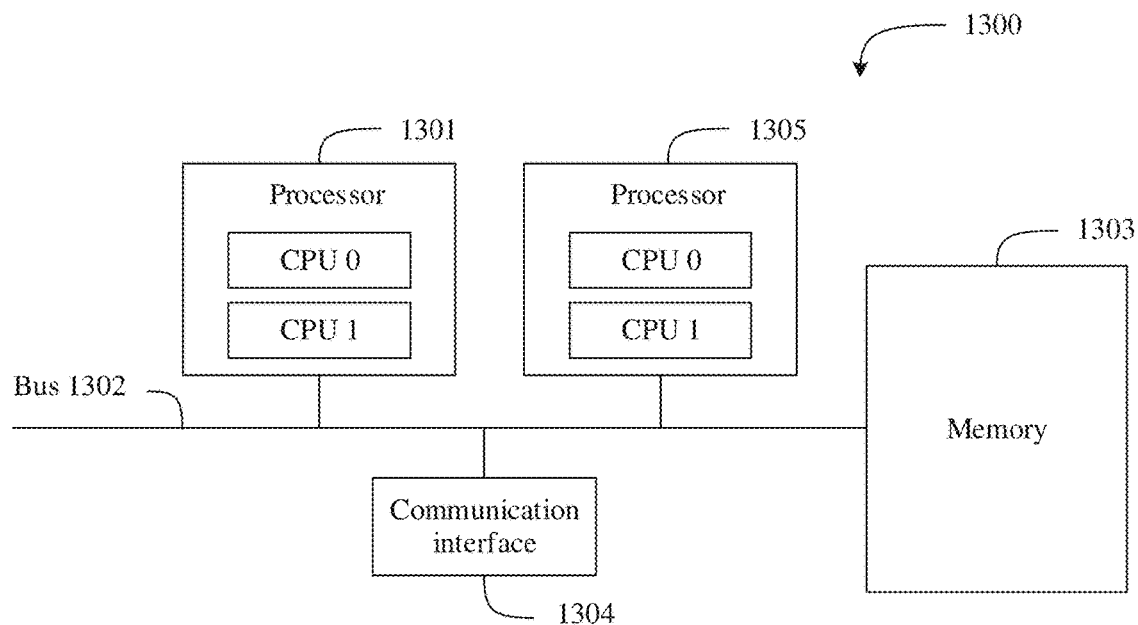
FIG. 13 is still another schematic block diagram of an access network device according to an embodiment of this application.

When the communication apparatus is an access network device, the apparatus 1300 in FIG. 13 is a simplified schematic structural diagram of the access network device. FIG. 13 is a schematic diagram of a hardware structure of the apparatus 1300 according to an embodiment of this application. The apparatus 1300 includes at least one processor 1301, and is configured to implement a function of the access network device provided in the embodiments of this application. The apparatus 1300 may further include a bus 1302 and at least one communication interface 1304. The apparatus 1300 may further include a memory 1303.

The bus 1302 may be configured to transmit information between the foregoing components.

The communication interface 1304 is configured to communicate with another device or a communication network, for example, an Ethernet, a RAN, or a WLAN. The communication interface 1304 may be an interface, a circuit, a transceiver, or another apparatus that can implement communication. This is not limited in this application. The communication interface 1304 may be coupled to the processor 1301. It should be noted that in this embodiment of this application, when the access network device is used as a receive end device, the transceiver may be replaced with a receiver; when the access network device is used as a transmit end device, the transceiver may be replaced with a transmitter. No matter whether the access network device is used as a receive end device or a transmit end device, the access network device has both a sending function and a receiving function, that is, the access network device includes the foregoing transceiver.

The memory 1303 is configured to store program instructions, which may be controlled and executed by the processor 1301, to implement the communication method provided in the following embodiments of this application. For example, the processor 1301 is configured to invoke and execute the instructions stored in the memory 1303, to implement the communication method provided in the following embodiments of this application.

Optionally, the memory 1303 may be included in the processor 1301.

In a specific implementation, in an embodiment, the processor 1301 may include one or more CPUs, for example, a CPU 0 and a CPU 1 in FIG. 13. The CPU herein is merely an example for description. In different implementations, the CPU may be replaced with a processor of any type or function.

In a specific implementation, in an embodiment, the apparatus 1300 may include a plurality of processors, for example, the processor 1301 and a processor 1305 in FIG. 13. Each of the processors may be a single-core processor, or may be a multi-core processor. The processor herein may be one or more devices, circuits, and/or processing cores for processing data (for example, computer program instructions).

When the communication apparatus is a chip, the chip includes a transceiver unit and a processing unit. The transceiver unit may be an input/output circuit or a communication interface. The processing unit may be a processor, a microprocessor, or an integrated circuit, integrated on the chip.

An embodiment of this application further provides a computer-readable storage medium. The computer-readable storage medium stores a computer program. When the program is executed by a processor, a procedure related to the terminal device in the embodiment shown in FIG. 3 provided in the foregoing method embodiments may be implemented.

An embodiment of this application further provides a computer-readable storage medium. The computer-readable storage medium stores a computer program. When the program is executed by a processor, a procedure related to the access network device in the embodiment shown in FIG. 3 provided in the foregoing method embodiments may be implemented.

An embodiment of this application further provides a computer program product including instructions. When the instructions are executed, the method on a terminal device side in the method embodiment shown in FIG. 3 is performed.

An embodiment of this application further provides a computer program product including instructions. When the instructions are executed, the method on an access network device side in the method embodiment shown in FIG. 3 is performed.

It should be understood that the processor mentioned in the embodiments of this application may include but is not limited to at least one of the following: a central processing unit (central processing unit, CPU), a microprocessor, a digital signal processor (digital signal processor, DSP), a microcontroller unit (microcontroller unit, MCU), or various computing devices that run software, such as an artificial intelligence processor, where each computing device may include one or more cores configured to execute software instructions to perform an operation or perform processing. The processor may be an independent semiconductor chip, or may be integrated with another circuit to constitute a semiconductor chip. For example, the processor may constitute a system on chip (system on chip, SoC) with another circuit (for example, an encoding/decoding circuit, a hardware acceleration circuit, or various buses and interface circuits). Alternatively, the processor may be integrated into an application-specific integrated circuit (application specific integrated circuit, ASIC) as a built-in processor of the ASIC, and the ASIC integrated with the processor may be independently packaged or may be packaged with another circuit. The processor includes a core configured to perform an operation or processing by executing software instructions, and may further include a necessary hardware accelerator, for example, a field programmable gate array (field programmable gate array, FPGA), a programmable logic device (programmable logic device, PLD), or a logic circuit that implements a special-purpose logic operation.

It should be noted that when the processor is a general-purpose processor, a DSP, an ASIC, an FPGA or another programmable logic device, a discrete gate or a transistor logic device, or a discrete hardware component, the memory (storage module) is integrated into the processor.

It should be further understood that the memory mentioned in the embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) that is used as an external cache. Through examples rather than limitative descriptions, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that the memory described in this specification is intended to include but is not limited to these and any memory of another proper type.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

A person of ordinary skill in the art may be aware that units and algorithm steps in the examples described with reference to the embodiments disclosed in this specification can be implemented by electronic hardware or a combination of computer software and electronic hardware. Whether these functions are performed by hardware or software depends on particular applications and design constraint conditions of the technical solutions. A person skilled in the art may use different methods to implement the described functions for each particular application, but it should not be considered that the implementation goes beyond the scope of this application.

A person skilled in the art may clearly understand that for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the method described in the embodiments of this application. The storage medium includes any medium such as a USB flash drive, a removable hard disk, a read-only memory (read-only memory, ROM), a random access memory (random access memory, RAM), a magnetic disk, or an optical disc, that can store program code.

The foregoing descriptions are merely specific implementations of this application, but are not intended to limit the protection scope of the embodiments of this application. Any variation or replacement readily figured out by a person skilled in the art within the technical scope disclosed in the embodiments of this application shall fall within the protection scope of this application. Therefore, the protection scope of the embodiments of this application shall be defined by the protection scope of the claims.

What is claimed is:

1. A communication method, wherein the method is applicable to a terminal device, and the method comprises:
    receiving a first downlink channel in a first area from an access network device, wherein the first downlink channel is used to broadcast first data; and
    receiving a second downlink channel in a second area from the access network device, wherein the second downlink channel is used to rebroadcast the first data, wherein
    the first downlink channel is scrambled by using a first identifier, the second downlink channel is scrambled by using a second identifier, and the first identifier and the second identifier are identifiers configured by the access network device, and
    wherein the first downlink channel and the second downlink channel use different cyclic prefixes set according to sizes of respective areas the first and second downlink channels broadcast to.

2. The method according to claim 1, further comprising:
    determining a channel resource used to feed back acknowledgement information, wherein the channel resource is indicated by using indication information, and sending a negative acknowledgment to the access network device on the channel resource before receiving the second downlink channel.

3. The method according to claim 1, wherein the channel resource is a feedback channel resource that belongs to a first resource set comprising a set of feedback channel resources corresponding to the first area.

4. The method according to claim 1, wherein
    the first identifier comprises at least one of a first cell identifier and a first radio network temporary identifier, and the first cell identifier is an identifier corresponding to the first area.

5. The method according to claim 1, wherein
    the second identifier comprises at least one of a second cell identifier and a second radio network temporary identifier, and the second cell identifier is an identifier corresponding to the second area.

6. The method according to claim 1, wherein
the first downlink channel is scheduled by using downlink control information (DCI) or configured by using higher layer signaling; and
the second downlink channel is scheduled by using DCI.

7. The method according to claim 1, wherein the first downlink channel and the second downlink channel meet at least one of the following:
additional waveform parameters of the first downlink channel and the second downlink channel are different;
at least one of a first control channel for scheduling the first downlink channel and a second control channel for scheduling the second downlink channel comprises a first indication field, and the first indication field is used to indicate that transmission on the second downlink channel is retransmission for the first downlink channel; and
a preset or predefined time sequence relationship exists between a time domain resource of the first downlink channel and a time domain resource of the second downlink channel.

8. A communication method, wherein the method is applicable to an access network device, and the method comprises:
sending a first downlink channel in a first area to a terminal device, wherein the first downlink channel broadcasts first data; and
sending a second downlink channel in a second area to the terminal device, wherein the second downlink channel rebroadcasts the first data, wherein
the first downlink channel is scrambled by using a first identifier, the second downlink channel is scrambled by using a second identifier, and the first identifier and the second identifier are identifiers configured by the access network device, and
wherein the first downlink channel and the second downlink channel use different cyclic prefixes set according to sizes of respective areas the first and second downlink channels broadcast to.

9. The method according to claim 8, the method further comprising:
sending indication information to the terminal device, wherein the indication information is used to indicate a channel resource for feeding back acknowledgement information by the terminal device, and
receiving a negative acknowledgment from the terminal device on the channel resource before sending the second downlink channel to the terminal device.

10. The method according to claim 8, wherein the channel resource is a feedback channel resource corresponding to the second area, the channel resource belonging to a first resource set comprising a set of feedback channel resources corresponding to the first area.

11. The method according to claim 8, wherein
the first identifier comprises at least one of a first cell identifier and a first radio network temporary identifier, and the first cell identifier is an identifier corresponding to the first area.

12. The method according to claim 8, wherein
the second identifier comprises at least one of a second cell identifier and a second radio network temporary identifier, and the second cell identifier is an identifier corresponding to the second area.

13. The method according to claim 8, wherein
the first downlink channel is scheduled by using downlink control information (DCI) or configured by using higher layer signaling; and
the second downlink channel is scheduled by using DCI.

14. The method according to claim 8, wherein the first downlink channel and the second downlink channel meet at least one of the following:
additional waveform parameters of the first downlink channel and the second downlink channel are different;
at least one of a first control channel for scheduling the first downlink channel and a second control channel for scheduling the second downlink channel comprises a first indication field, and the first indication field is used to indicate that transmission on the second downlink channel is retransmission for the first downlink channel; and
a preset or predefined time sequence relationship exists between a time domain resource of the first downlink channel and a time domain resource of the second downlink channel.

15. An apparatus, comprising:
one or more processors; and
one or more memories coupled to the one or more processors and storing programming instructions for execution by the one or more processors to cause the apparatus to perform a method comprising:
receiving a first downlink channel in a first area from an access network device, wherein the first downlink channel is used to broadcast first data; and
receiving a second downlink channel in a second area from the access network device, wherein the second downlink channel is used to rebroadcast the first data, wherein
the first downlink channel is scrambled by using a first identifier, the second downlink channel is scrambled by using a second identifier, and the first identifier and the second identifier are identifiers configured by the access network device, and
wherein the first downlink channel and the second downlink channel use different cyclic prefixes set according to sizes of respective areas the first and second downlink channels broadcast to.

16. The method according to claim 15, wherein the method further comprises:
determining a channel resource used to feed back acknowledgement information, wherein the channel resource is indicated by using indication information, and
sending a negative acknowledgment to the access network device on a channel resource before receiving the second downlink channel.

17. The method according to claim 15, wherein the channel resource is associated with a first resource set comprising a set of feedback channel resources corresponding to the first area.

18. The method according to claim 15, wherein
the first identifier comprises at least one of a first cell identifier and a first radio network temporary identifier, and the first cell identifier is an identifier corresponding to the first area.

19. The method according to claim 15, wherein
the second identifier comprises at least one of a second cell identifier and a second radio network temporary identifier, and the second cell identifier is an identifier corresponding to the second area.

20. The method according to claim 15, wherein
the first downlink channel is scheduled by using downlink control information DCI or configured by using higher layer signaling; and
the second downlink channel is scheduled by using DCI.

* * * * *